(12) United States Patent
Shih et al.

(10) Patent No.: US 10,955,970 B2
(45) Date of Patent: Mar. 23, 2021

(54) POINTING DIRECTION DETERMINATION SYSTEM AND METHOD THEREOF

(71) Applicants: Industrial Technology Research Institute, Hsinchu (TW); Intellectual Property Innovation Corporation, Hsinchu (TW)

(72) Inventors: Hung-Pin Shih, Miaoli County (TW); Chien-Ju Lee, Taoyuan (TW); Heng-Yin Chen, Hsinchu County (TW)

(73) Assignees: Industrial Technology Research Institute, Hsinchu (TW); Intellectual Property Innovation Corporation, Hsinchu (TW)

(*) Notice: Subject to any disclaimer, the term of this patent is extended or adjusted under 35 U.S.C. 154(b) by 0 days.

(21) Appl. No.: 16/244,110

(22) Filed: Jan. 10, 2019

(65) Prior Publication Data

US 2020/0073509 A1 Mar. 5, 2020

(30) Foreign Application Priority Data

Aug. 28, 2018 (TW) .............................. 107129909 A

(51) Int. Cl.
*G06F 3/042* (2006.01)
*G06F 3/0488* (2013.01)
(Continued)

(52) U.S. Cl.
CPC ............ *G06F 3/0425* (2013.01); *G06F 3/013* (2013.01); *G06F 3/017* (2013.01);
(Continued)

(58) Field of Classification Search
CPC .... G06F 3/0425; G06F 3/04883; G06F 3/017; G06F 3/013; G06F 2203/04104; G06T 7/70; G06T 7/50
See application file for complete search history.

(56) References Cited

U.S. PATENT DOCUMENTS 8,698,771 B2 4/2014 Lee et al.
9,239,642 B2 1/2016 Son et al.
(Continued)

FOREIGN PATENT DOCUMENTS

CN 104471511 3/2015
CN 104956428 9/2015
(Continued)

OTHER PUBLICATIONS

Domagoj Baricevic, et al., "User-Perspective AR Magic Lens from Gradient-Based IBR and Semi-Dense Stereos," IEEE Transactions on Visualization and Computer Graphics, vol. 23, No. 7, Jul. 2017, pp. 1838-1851.
(Continued)

*Primary Examiner* — Chad M Dicke
(74) *Attorney, Agent, or Firm* — JCIPRNET

(57) ABSTRACT

A direction determination system and a direction determination method are provided. The direction determination system includes a display screen, at least one image capturing device and a processing device. The image capturing device is configured to capture image data including a plurality of users. The processing device is coupled to the display screen and the image capturing device to receive the image data, and detects a plurality of characteristics of the plurality of users according to the image data. The processing device performs corresponding pairing on the characteristics to obtain a characteristic group of each of the users. The processing device determines a pointing direction of each of the users toward the display screen according to at least two characteristics of the characteristic group of each of the users.

16 Claims, 17 Drawing Sheets

(51) Int. Cl.
*G06F 3/01* (2006.01)
*G06T 7/70* (2017.01)
*G06T 7/50* (2017.01)

(52) U.S. Cl.
CPC ............ *G06F 3/04883* (2013.01); *G06T 7/50* (2017.01); *G06T 7/70* (2017.01); *G06F 2203/04104* (2013.01); *G06T 2207/30196* (2013.01)

(56) References Cited

U.S. PATENT DOCUMENTS

| | | | |
|---|---|---|---|
| 2010/0066667 A1* | 3/2010 | MacDougall | G06K 9/00228 345/156 |
| 2011/0267265 A1* | 11/2011 | Stinson | G06F 3/017 345/157 |
| 2012/0206333 A1* | 8/2012 | Kim | G06F 3/013 345/156 |
| 2012/0256854 A1 | 10/2012 | Lee et al. | |
| 2012/0268359 A1* | 10/2012 | Chen | G06F 3/015 345/156 |
| 2013/0031497 A1* | 1/2013 | Arrasvuori | G06F 3/0488 715/764 |
| 2013/0194238 A1* | 8/2013 | Sakai | H04N 21/4314 345/175 |
| 2013/0293467 A1* | 11/2013 | Norden | G06K 9/00597 345/158 |
| 2013/0321347 A1 | 12/2013 | Kim | |
| 2014/0240293 A1* | 8/2014 | McCaughan | G06F 3/0426 345/175 |
| 2014/0361996 A1 | 12/2014 | Eden et al. | |
| 2015/0049078 A1* | 2/2015 | Mealing | G06F 3/0304 345/419 |
| 2015/0077357 A1* | 3/2015 | Han | G06F 3/013 345/173 |
| 2015/0145762 A1* | 5/2015 | Shimura | G06F 3/017 345/156 |
| 2015/0234508 A1 | 8/2015 | Cho et al. | |
| 2015/0235346 A1 | 8/2015 | Kim et al. | |
| 2015/0302617 A1* | 10/2015 | Shimura | G06K 9/00355 345/441 |
| 2015/0338914 A1* | 11/2015 | Andrysco | G06F 3/041 345/173 |
| 2016/0170603 A1* | 6/2016 | Bastien | G06T 7/80 348/49 |
| 2016/0179205 A1 | 6/2016 | Katz | |
| 2016/0231862 A1* | 8/2016 | Tretter | G06F 3/0416 |
| 2016/0266722 A1* | 9/2016 | Matsubara | G06F 3/0425 |
| 2017/0061694 A1* | 3/2017 | Giraldi | G06T 19/006 |
| 2017/0139478 A1 | 5/2017 | Jeon et al. | |
| 2018/0275854 A1* | 9/2018 | Ikeda | G03B 21/145 |
| 2019/0033999 A1* | 1/2019 | Lu | G06F 3/045 |
| 2019/0091565 A1* | 3/2019 | Nelson | G07F 17/3211 |
| 2019/0220010 A1* | 7/2019 | Leonard | B60W 50/10 |
| 2019/0324589 A1* | 10/2019 | Pedroso Moschini | G06F 3/0304 |
| 2019/0354178 A1* | 11/2019 | Hwang | H04N 21/482 |
| 2019/0359060 A1* | 11/2019 | Satam | B60K 35/00 |
| 2020/0027245 A1* | 1/2020 | Arkhipau | G06T 7/90 |

FOREIGN PATENT DOCUMENTS

| | | |
|---|---|---|
| TW | I493406 | 7/2015 |
| TW | I516093 | 1/2016 |

OTHER PUBLICATIONS

"Office Action of Taiwan Counterpart Application", dated Oct. 13, 2020, p. 1-p. 4.

* cited by examiner

POINTING DIRECTION DETERMINATION SYSTEM AND METHOD THEREOF

CROSS-REFERENCE TO RELATED APPLICATION

This application claims the priority benefit of a Taiwan application serial no. 107129909, filed on Aug. 28, 2018. The entirety of the above-mentioned patent application is hereby incorporated by reference herein.

BACKGROUND OF THE DISCLOSURE

Field of the Disclosure

The disclosure relates to a direction determination system and a direction determination method.

Description of Related Art

Although a directional interactive display method combining a display technology and a biometric tracking technology or a touch technology have gradually appeared in various applications, theses technologies still have need improvement. For example, in case that multiple users interact with a display system at the same time, the display system is hard to correctly determine which of a plurality of pairs of eyes and which of a plurality of fingers (or a plurality of touches) corresponds to the same user, so that the display system is liable to have a problem of directionality disorder.

SUMMARY OF THE DISCLOSURE

An embodiment of the disclosure provides a direction determination method including following steps. Image data including a plurality of users is captured by at least one image capturing device. A processing device is adopted to execute following steps: detecting a plurality of characteristics of the plurality of users according to the image data; performing corresponding pairing on the characteristics to obtain a characteristic group of each of the users; and determining a pointing direction of each of the users toward a display screen according to at least two characteristics of the characteristic group of each of the users.

An embodiment of the disclosure provides a direction determination system including a display screen, at least one image capturing device and a processing device. The image capturing device is configured to capture image data including a plurality of users. The processing device is coupled to the display screen and the image capturing device to receive the image data, and detects a plurality of characteristics of the plurality of users according to the image data. The processing device performs corresponding pairing on the characteristics to obtain a characteristic group of each of the users, and determines a pointing direction of each of the users toward the display screen according to at least two characteristics of the characteristic group of each of the users.

In order to make the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
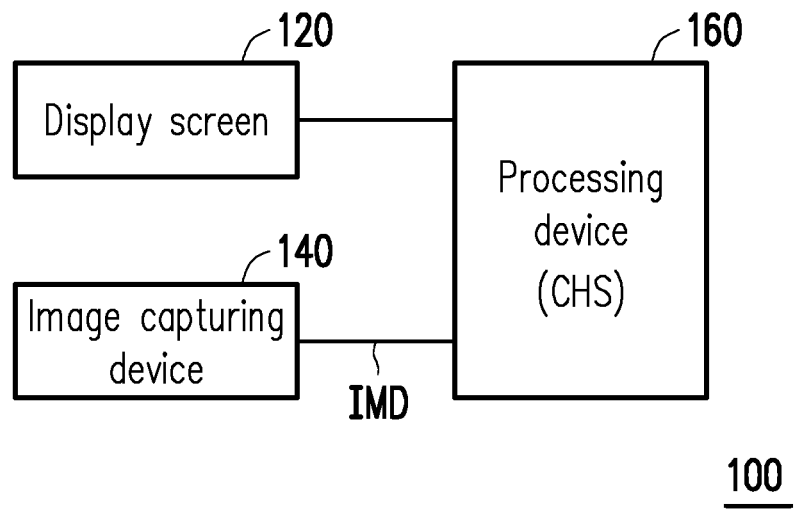
FIG. 1 is a block diagram of a direction determination system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. The provided embodiments are only a part of the disclosure, and not all of embodiments of the disclosure are disclosed. To be specific, these embodiments are only examples of a direction determination system and a direction determination method of the disclosure.

FIG. 1 is a block diagram of a direction determination system according to an embodiment of the disclosure. Referring to FIG. 1, the direction determination system 100 may be interacted with a plurality of users. Further, the direction determination system 100 may determine a pointing direction of each of the users, to accordingly provide a corresponding display result and content. The direction determination system 100 may include a display screen 120, an image capturing device 140 and a processing device 160, though the disclosure is not limited thereto. The display screen 120 is configured to display an image frame. The image capturing device 140 is configured to capture image data IMD including the plurality of users. The processing device 160 may be coupled to the display screen 120 and the image capturing device 140. The processing device 160 receives the image data IMD from the image capturing device 140, and detects a plurality of characteristics CHS of the plurality of users according to the image data IMD. The processing device 160 may respectively perform corresponding pairing on the characteristics CHS and the users. In detail, the processing device 160 performs corresponding pairing on the characteristics CHS to obtain a characteristic group of each of the users, and determines a pointing direction of each of the users toward the display screen 120 according to at least two characteristics of the characteristic group of each of the users. Moreover, the processing device 160 further determines a target viewed by each of the users according to the pointing direction of each of the users toward the display screen 120, and provides content associated with the target on the display screen 120.

In an embodiment of the disclosure, the characteristics CHS are, for example, eyes, a hand (including fingers), a gazing direction, a gesture, a skeleton of each of the users, coordinates of the eyes in a space, coordinates of the fingers in the space or touch coordinates of the finger touching the display screen 120, etc., though the disclosure is not limited by the disclosure.

In an embodiment of the disclosure, the display screen 120 is, for example, a Liquid Crystal Display (LCD), a Light-Emitting Diode (LED) display (which includes an inorganic LED display or an organic LED display), a projection display or other types of display screens. In another embodiment of the disclosure, the display screen 120 may be a transparent display. The transparent display refers to that the display screen itself has a certain degree of light transmittance and may present a background behind the display screen. The display screen 120 of the transparent display may be adapted to various applications such as viewing windows in buildings (e.g., viewing platforms, aquariums and museums), exhibition windows, vehicle glass and display, etc.

In an embodiment of the disclosure, the number of the image capturing device 140 may be at least one, and the image capturing devices 140 may be disposed at different positions according to different application occasions, such that the image capturing device 140 has a better imaging range and imaging angle, to avoid shielding the characteristics of the users. The image capturing device 140 may include an imaging capturing lens having a lens and a photosensitive element. The photosensitive element is used for sensing an intensity of light entering the lens, to generate an image. The photosensitive element is, for example, a Charge Coupled Device (CCD), a Complementary Metal-Oxide Semiconductor (CMOS) device or other device, which is not limited by the disclosure. In another embodiment, the image capturing device 140 may also include a programmable processing unit, a micro-processor, an Application Specific Integrated Circuits (ASIC), a Programmable Logic Device (PLD) or other similar circuit device adapted to implement a target identification function, which is not limited by the disclosure.

In an embodiment of the disclosure, the processing device 160 may be implemented by at least one System On Chip (SOC), a Field Programmable Gate Array (FPGA) chip, a Complex Programmable Logic Device (CPLD), a Microprocessor, a Central Processing Unit (CPU), a Digital Signal Processor (DSP), or other hardware device with computation capability.

In an embodiment of the disclosure, the direction determination system 100 further includes a storage device. The storage device is used for storing data such as images, programs, etc., and the storage device is, for example, any type of a stationary or mobile Random Access Memory (RAM), a Read-Only Memory (ROM), a flash memory, a hard disk or other similar device, integrated circuit and a combination thereof.

Figure 2:
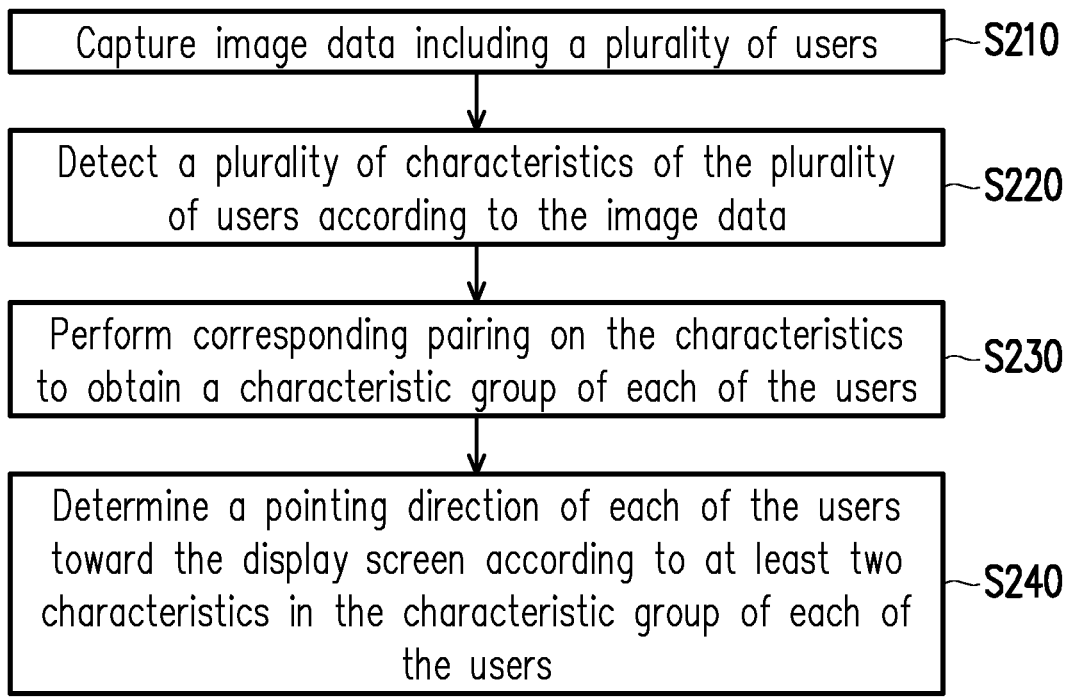
FIG. 2 is a flowchart illustrating a direction determination method according to an embodiment of the disclosure.

FIG. 2 is a flowchart illustrating a direction determination method according to an embodiment of the disclosure. The method steps shown in FIG. 2 may be implemented by the direction determination system 100 shown in FIG. 1. Referring to FIG. 1 and FIG. 2.

First, in step S210, the image capturing device 140 captures the image data IMD including a plurality of users. Then, in step S220, the processing device 160 detects a plurality of characteristics CHS of the plurality of users according to the image data IMD. Then, in step S230, the processing device 160 performs corresponding pairing on the characteristics CHS to obtain a characteristic group of each of the users. Then, in step S240, the processing device 160 determines a pointing direction of each of the users toward the display screen 120 according to at least two characteristics in the characteristic group of each of the users. Several embodiments are provided below to describe the operation of the direction determination system 100 of FIG. 1 and an implementation detail of the method flow of FIG. 2.

Figure 3A:
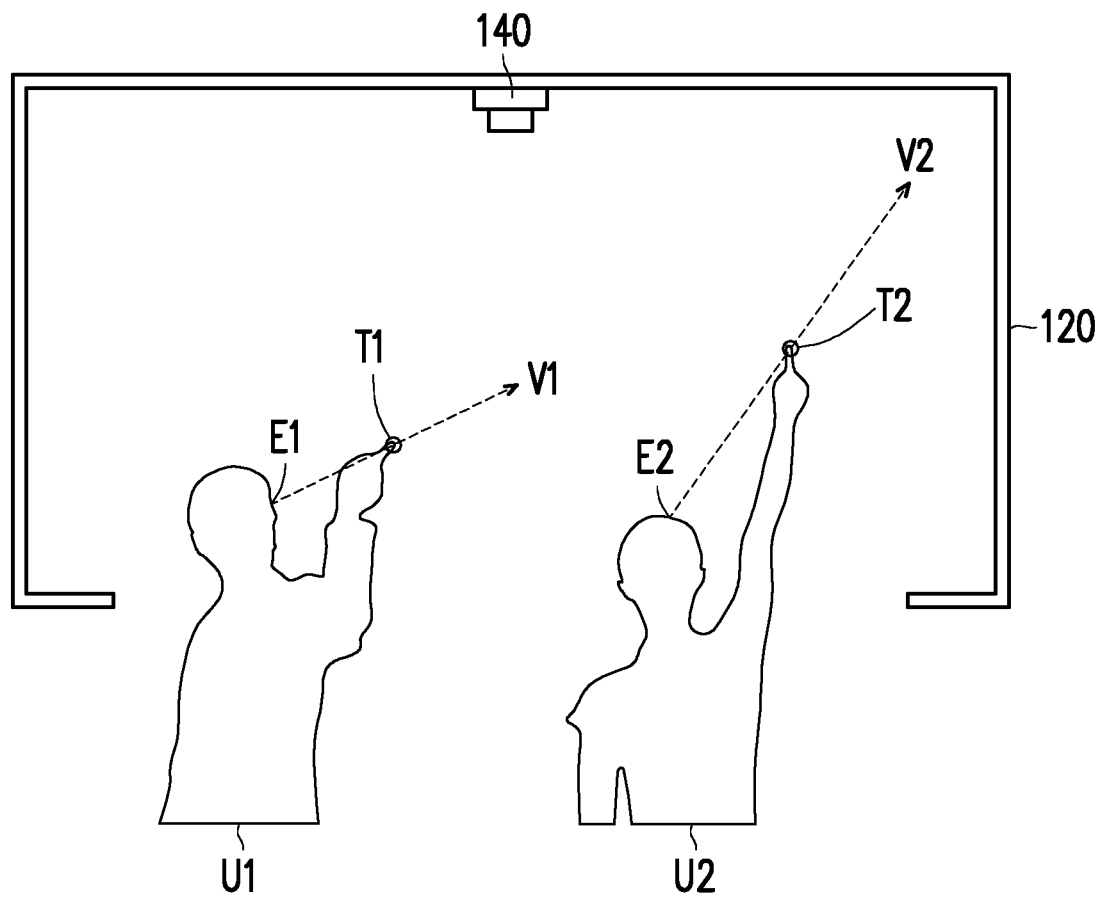
FIG. 3A is a schematic diagram of determining pointing directions of the users by the direction determination system of FIG. 1 according to an embodiment of the disclosure.
Figure 3B:
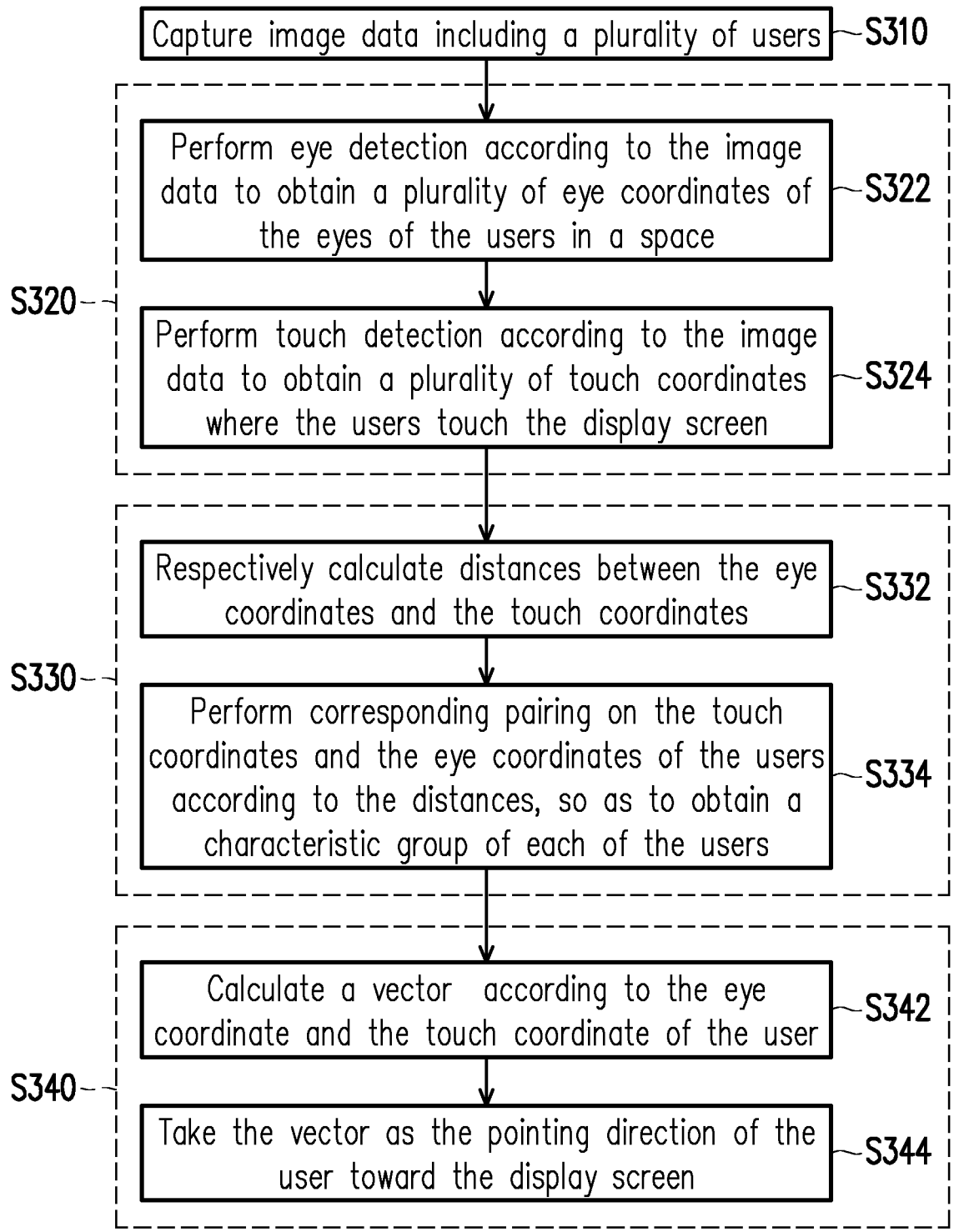
FIG. 3B is a flowchart illustrating detailed steps of the direction determination method of FIG. 2 according to an embodiment of the disclosure.

FIG. 3A is a schematic diagram of determining pointing directions of the users by the direction determination system of FIG. 1 according to an embodiment of the disclosure. FIG. 3B is a flowchart illustrating detailed steps of the direction determination method of FIG. 2 according to an embodiment of the disclosure, which may be used for determining the pointing directions of the users of FIG. 3A. Referring to FIG. 1, FIG. 3A and FIG. 3B.

In step S310, the image capturing device 140 captures the image data IMD including users U1 and U2. In step S320, the processing device 160 detects a plurality of characteristics CHS of the users U1 and U2 according to the image data IMD, where the characteristics CHS may include eye coordinates and touch coordinates of the users U1 and U2. In detail, the step S320 includes detailed steps S322 and S324. In the step S322, the processing device 160 performs eye detection according to the image data IMD to obtain a coordinate position E1 (which is referred to as an eye coordinate E1 hereinafter) of the eyes of the user U1 in the space and a coordinate position E2 (which is referred to as an eye coordinate E2 hereinafter) of the eyes of the user U2 in the space. Moreover, in the step S324, the processing device 160 performs touch detection according to the image data IMD to obtain coordinate positions T1, T2 (which are referred to as touch coordinates T1, T2 hereinafter) where the users U1, U2 touch the display screen 120.

In step S330, the processing device 160 performs corresponding pairing on the touch coordinates T1, T2 and the eye coordinates E1, E2 of the users U1, U2. In detail, the step S330 includes detailed steps S332 and S334. In the step S332, the processing device 160 respectively calculates distances between the eye coordinates E1, E2 and the touch coordinates T1, T2. In the step S334, the processing device 160 performs corresponding pairing on the touch coordinates T1, T2 and the eye coordinates E1, E2 of the users U1, U2 according to the distances, to obtain a characteristic group of the user U1 and a characteristic group of the user U2.

In detail, the processing device 160 may determine the distance between the eye coordinate E1 of the user U1 and the touch coordinate T1 to be smaller than the distance between the eye coordinate E1 of the user U1 and the touch coordinate T2, so that the processing device 160 may pair the eye coordinate E1 of the user U1 with the touch coordinate T1, and take the eye coordinate E1 and the touch coordinate T1 as the characteristic group of the user U1. Similarly, the processing device 160 may determine the distance between the eye coordinate E2 of the user U2 and the touch coordinate T2 to be smaller than the distance between the eye coordinate E2 of the user U2 and the touch coordinate T1, so that the processing device 160 may pair the eye coordinate E2 of the user U2 with the touch coordinate T2, and take the eye coordinate E2 and the touch coordinate T2 as the characteristic group of the user U2.

In step S340, the processing device 160 determines a pointing direction of the user U1 toward the display screen 120 according to the characteristics (for example, the touch coordinate T1 and the eye coordinate E1) in the characteristic group of the user U1, and determines a pointing direction of the user U2 toward the display screen 120 according to the characteristics (for example, the touch coordinate T2 and the eye coordinate E2) in the characteristic group of the user U2. In detail, the step S340 includes detailed steps S342 and S344. In the step S342, the processing device 160 calculates a vector V1 according to the eye coordinate E1 and the touch coordinate T1 of the user U1, and calculates a vector V2 according to the eye coordinate E2 and the touch coordinate T2 of the user U2. In the step S344, the processing device 160 takes the vector V1 as the pointing direction of the user U1 toward the display screen 120, and takes the vector V2 as the pointing direction of the user U2 toward the display screen 120.

Figure 4A:
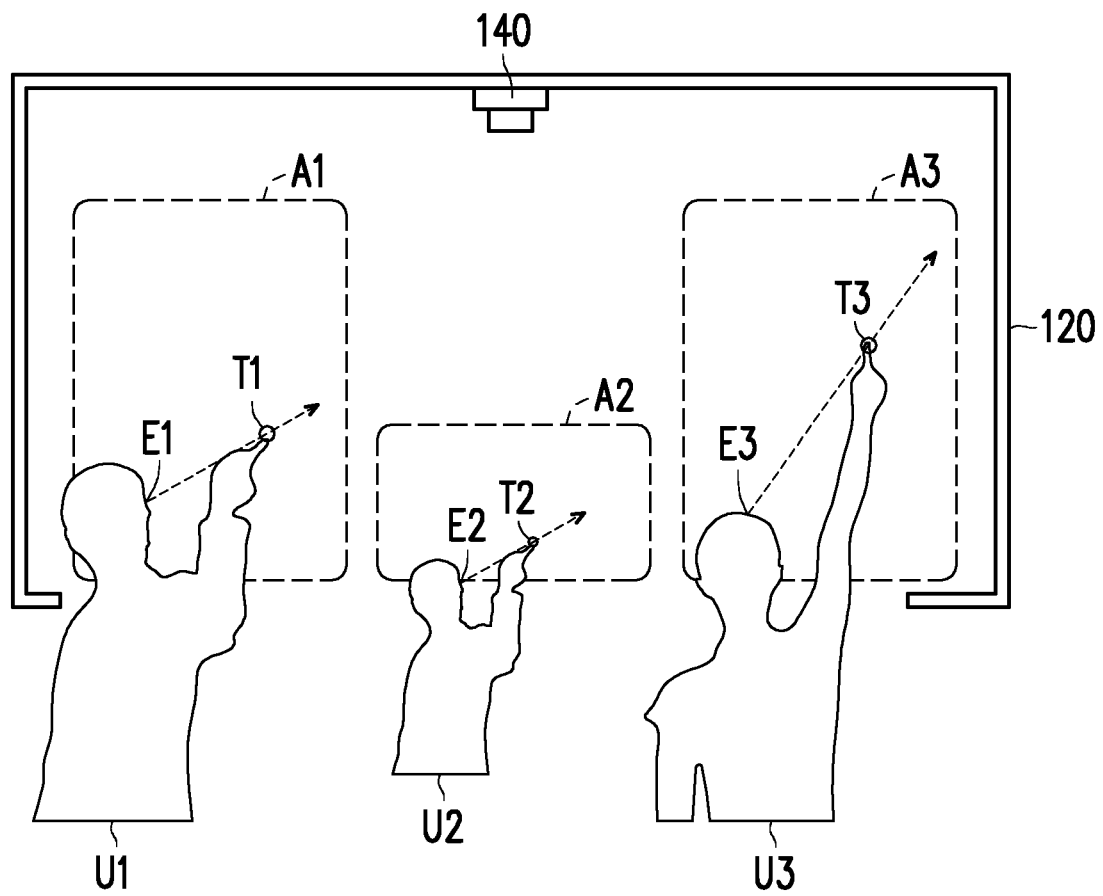
FIG. 4A is a schematic diagram of determining pointing directions of the users by the direction determination system of FIG. 1 according to another embodiment of the disclosure.
Figure 4B:
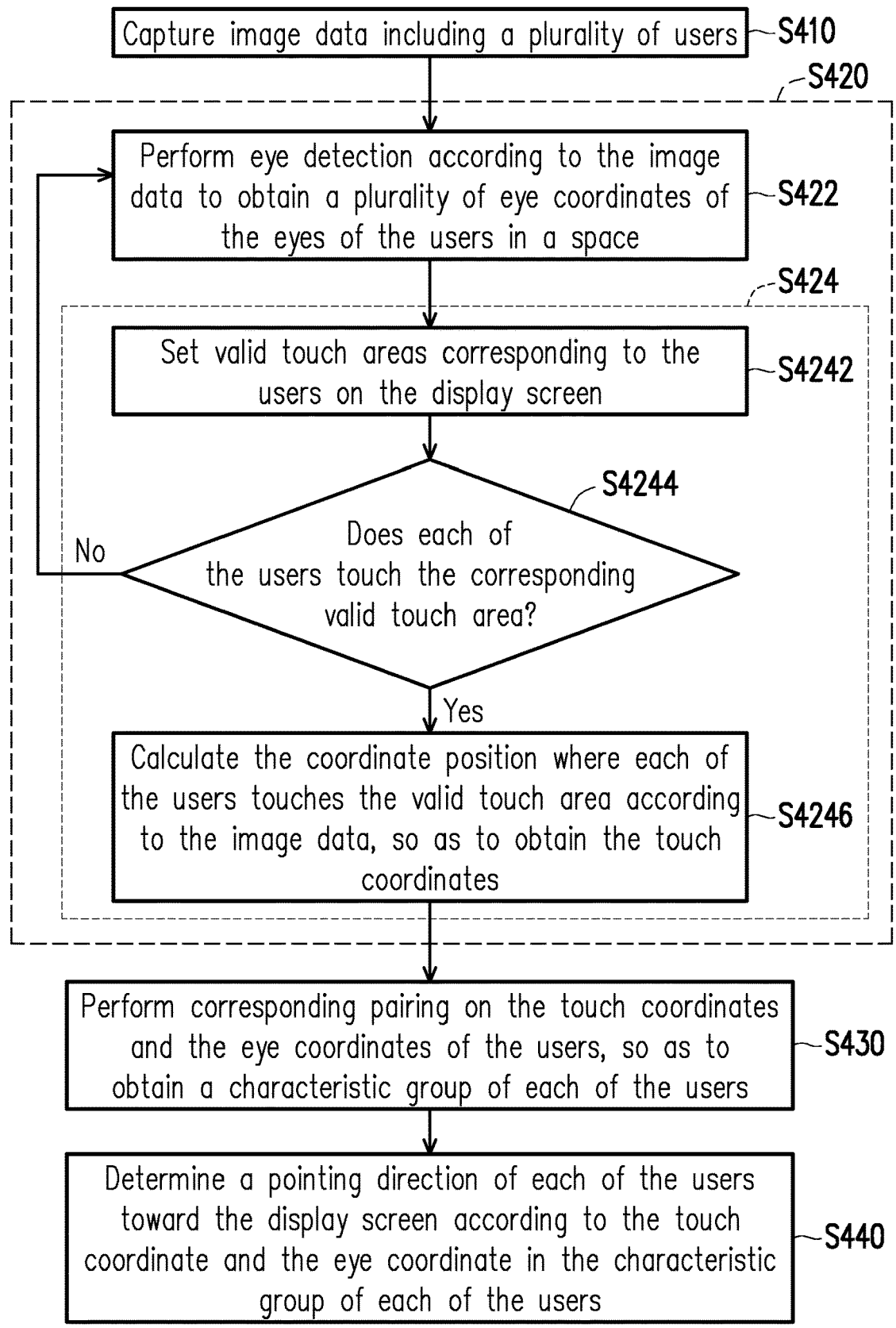
FIG. 4B is a flowchart illustrating detailed steps of the direction determination method of FIG. 2 according to another embodiment of the disclosure.

FIG. 4A is a schematic diagram of determining pointing directions of the users by the direction determination system of FIG. 1 according to another embodiment of the disclosure. FIG. 4B is a flowchart illustrating detailed steps of the direction determination method of FIG. 2 according to another embodiment of the disclosure, which may be used for determining the pointing directions of the users of FIG. 4A. Referring to FIG. 1, FIG. 4A and FIG. 4B.

In step S410, the image capturing device 140 captures the image data IMD including users U1, U2, U3. In step S420, the processing device 160 detects a plurality of characteristics CHS of the users U1, U2, U3 according to the image data IMD, where the characteristics CHS may include eye coordinates and touch coordinates of the users U1, U2, U3. In detail, the step S420 includes detailed steps S422 and S424. In the step S422, the processing device 160 performs eye detection according to the image data IMD to respectively obtain coordinate positions E1, E2, E3 (which are referred to as eye coordinates E1, E2, E3 hereinafter) of the eyes of the users U1, U2, U3 in a space. Moreover, in the step S424, the processing device 160 performs touch detection according to the image data IMD to obtain coordinate positions T1, T2, T3 (which are referred to as touch coordinates T1, T2, T3 hereinafter) where the users U1, U2, U3 touch the display screen 120.

In detail, the step S424 includes detailed steps S4242, S4244 and S4246. In the step S4242, the processing device 160 respectively sets valid touch areas A1, A2, A3 corresponding to the users U1, U2, U3 on the display screen 120. Then, in the step S4244, the processing device 160 determines whether the user U1 touches the corresponding valid touch area A1. If a determination result of the step S4244 is affirmative, in the step S4246, the processing device 160 calculates the coordinate position where the user U1 touches the valid touch area A1 according to the image data IMD, to obtain the touch coordinate T1. If the determination result of the step S4244 is negative, the flow returns to the step S422. Similarly, the detection method of the touch coordinates T2, T3 of the users U2, U3 may also be deduced according to the aforementioned description of the steps S4244 and S4246, and details thereof are not repeated.

In the step S430, the processing device 160 performs corresponding pairing on the touch coordinates T1, T2, T3 and the eye coordinates E1, E2, E3 of the users U1, U2, U3, to obtain a characteristic group of each of the users U1, U2, U3. In detail, the touch coordinate T1 detected by the processing device 160 is located in the valid touch area A1 of the user U1, the processing device 160 may pair the touch coordinate T1 with the eye coordinate E1 of the user U1, and take the eye coordinate E1 and the touch coordinate T1 as the characteristic group of the user U1. Similarly, the processing device 160 may pair the touch coordinate T2 with the eye coordinate E2 of the user U2, and take the eye coordinate E2 and the touch coordinate T2 as the characteristic group of the user U2, and may pair the touch coordinate T3 with the eye coordinate E3 of the user U3, and take the eye coordinate E3 and the touch coordinate T3 as the characteristic group of the user U3.

In step S440, the processing device 160 determines a pointing direction of the user U1 toward the display screen 120 according to the characteristics (for example, the touch coordinate T1 and the eye coordinate E1) in the characteristic group of the user U1, determines a pointing direction of the user U2 toward the display screen 120 according to the characteristics (for example, the touch coordinate T2 and the eye coordinate E2) in the characteristic group of the user U2, and determines a pointing direction of the user U3 toward the display screen 120 according to the characteristics (for example, the touch coordinate T3 and the eye coordinate E3) in the characteristic group of the user U3. Implementation detail of the step S440 may be deduced by referring to related description of the step S340 of FIG. 3B, and detail thereof is not repeated.

In an embodiment of the disclosure, the valid touch area A1 corresponding to the user U1 is, for example, a range adapted to be touched by both arms of the user U1 after both arms of the user U1 are horizontally lifted to a shoulder width and respectively spread to the left and to the right by a first angle and spread up and down by a second angle. Similarly, the valid touch areas A2 and A3 respectively corresponding to the users U2 and U3 may also be set according to the above method. In an embodiment of the disclosure, the above first angle is, for example, 5 degrees, and the second angle is, for example, 45 degrees, though the disclosure is not limited thereto. The first angle and the second angle may be determined according to an actual application or design requirement.

Figure 5A:
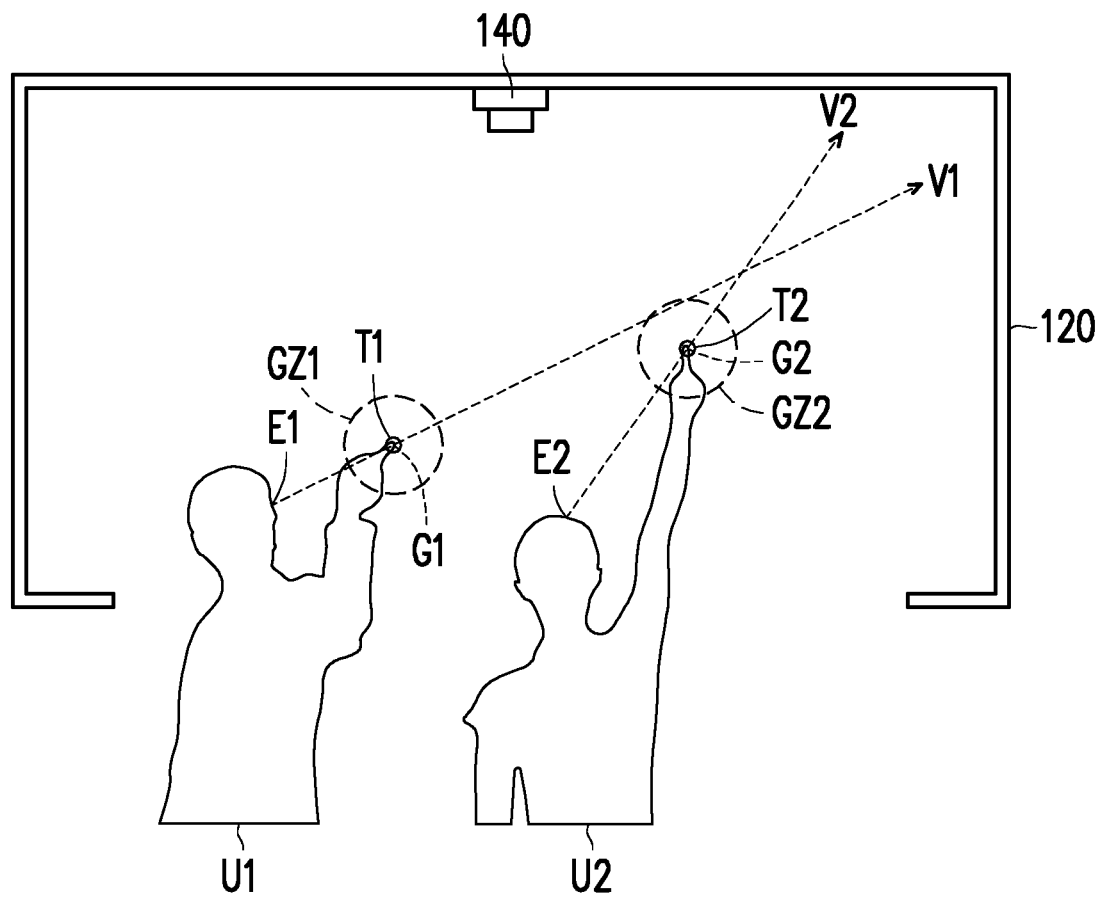
FIG. 5A is a schematic diagram of determining pointing directions of the users by the direction determination system of FIG. 1 according to still another embodiment of the disclosure.
Figure 5B:
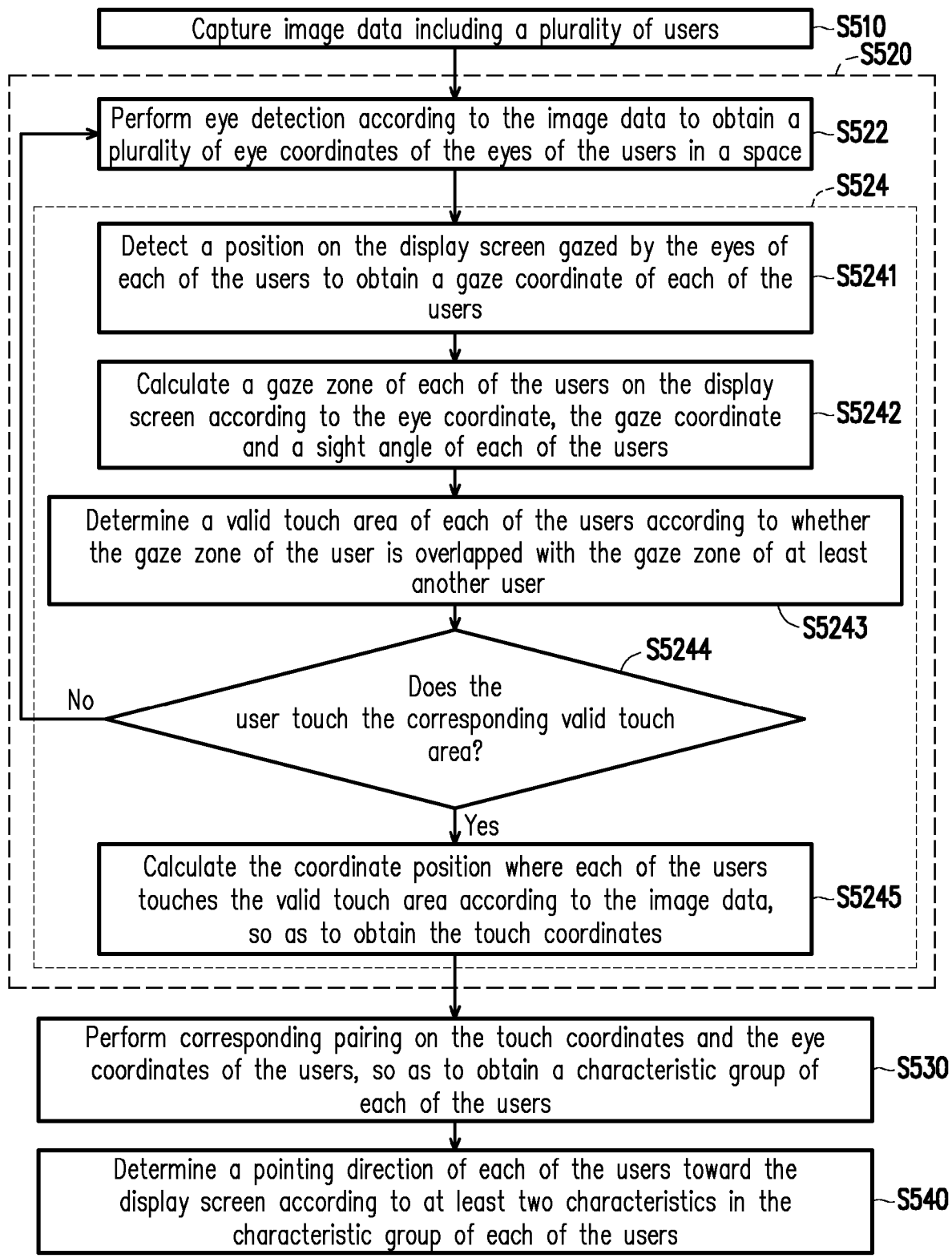
FIG. 5B is a flowchart illustrating detailed steps of the direction determination method of FIG. 2 according to still another embodiment of the disclosure.
Figure 5C:
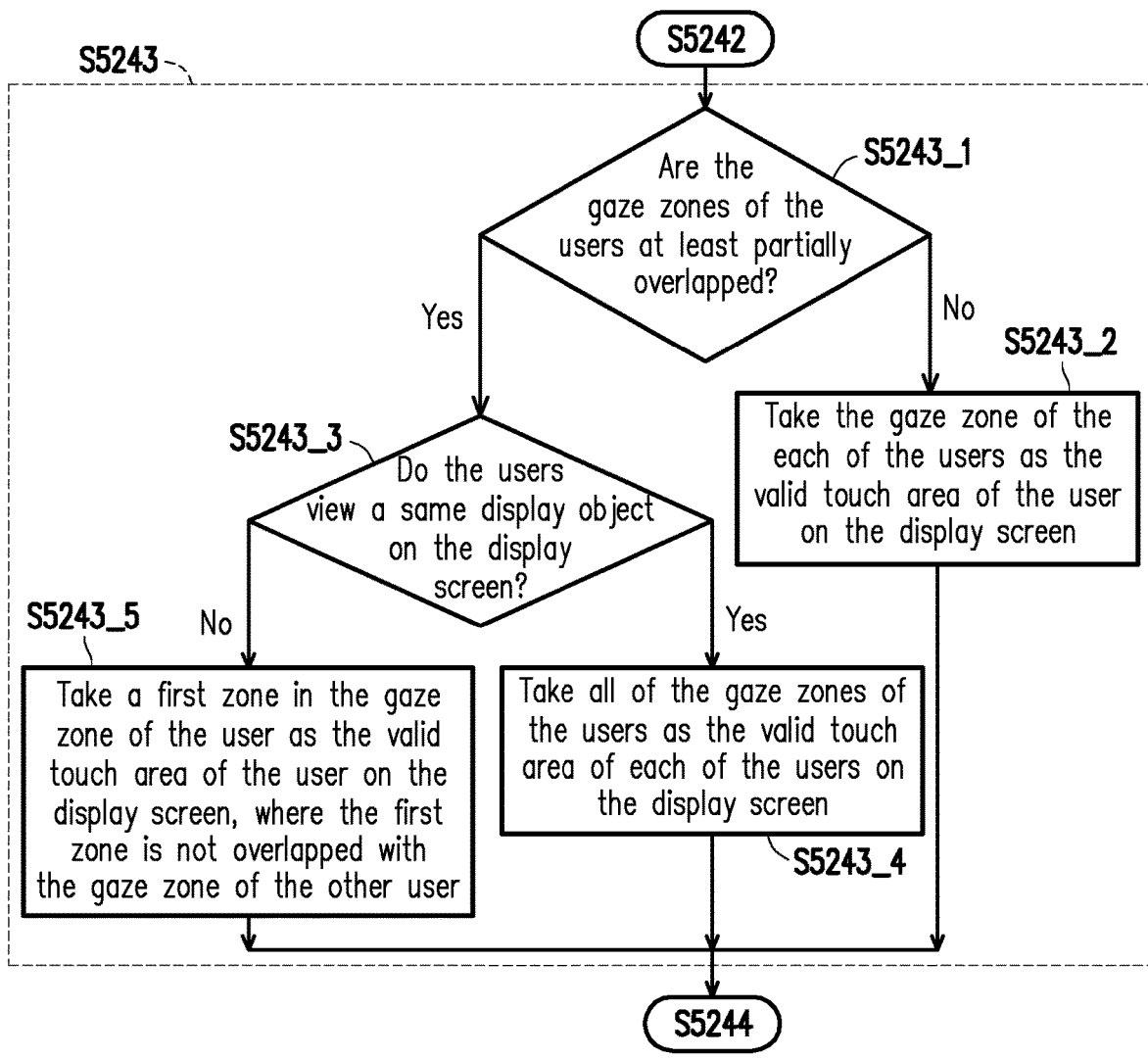
FIG. 5C is a flowchart illustrating detailed steps of a step S5243 of FIG. 5B according to an embodiment of the disclosure.

FIG. 5A is a schematic diagram of determining pointing directions of the users by the direction determination system of FIG. 1 according to still another embodiment of the disclosure. FIG. 5B is a flowchart illustrating detailed steps of the direction determination method of FIG. 2 according to still another embodiment of the disclosure, which may be used for determining the pointing directions of the users of FIG. 5A. FIG. 5C is a flowchart illustrating detailed steps of a step S5243 of FIG. 5B according to an embodiment of the disclosure. Referring to FIG. 1, FIG. 5A, FIG. 5B and FIG. 5C.

In step S510, the image capturing device 140 captures the image data IMD including the users U1 and U2. In step S520, the processing device 160 detects a plurality of characteristics CHS of the users U1 and U2 according to the image data IMD, where the characteristics CHS may include eye coordinates and touch coordinates of the users U1 and U2 and coordinate positions on the display screen 120 gazed by the eyes of the users U1 and U2. In detail, the step S520 includes detailed steps S522 and S524. In the step S522, the processing device 160 performs eye detection according to the image data IMD to obtain a coordinate position E1 (which is referred to as an eye coordinate E1 hereinafter) of the eyes of the user U1 in the space and a coordinate position E2 (which is referred to as an eye coordinate E2 hereinafter) of the eyes of the user U2 in the space. Moreover, in the step S524, the processing device 160 performs touch detection according to the image data IMD to obtain coordinate positions T1, T2 (which are referred to as touch coordinates T1, T2 hereinafter) where the users U1, U2 touch the display screen 120.

Further, the step S524 includes detailed step S5241-S5245. In the step S5241, the processing device 160 detects positions on the display screen 120 gazed by the eyes of the users U1 and U2 to obtain gaze coordinates G1, G2 of the users U1, U2. In the step S5242, the processing device 160 calculates gaze zones GZ1, GZ2 of each of the users U1, U2 on the display screen 120 according to the eye coordinates E1, E2, the gaze coordinates G1, G2 and sight angles of each of the users U1, U2. Particularly, the processing device 160 may take the gaze zones GZ1, GZ2 as the valid touch areas of the users U1, U2, which is described in detail later.

Figure 6:
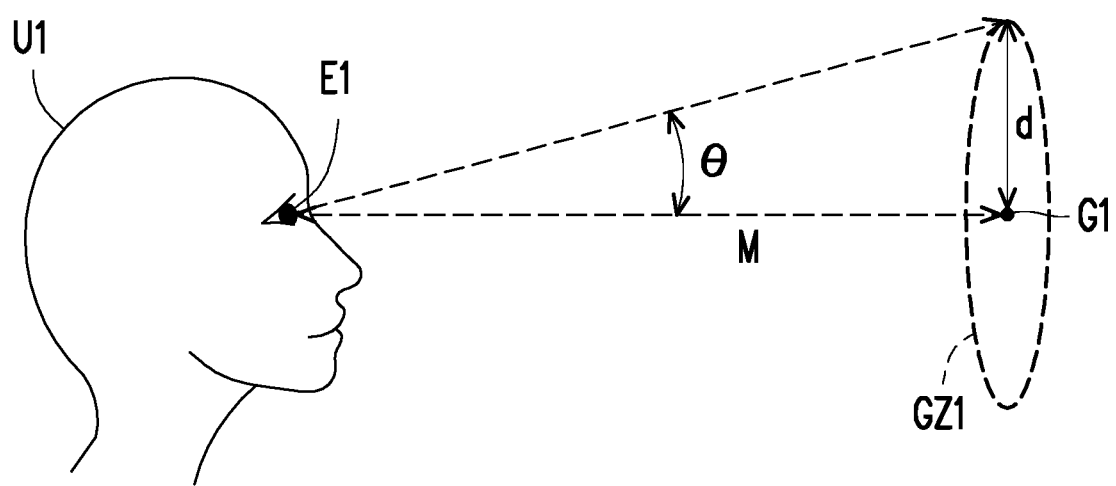
FIG. 6 is a schematic diagram of a gaze zone of a user on a display screen according to an embodiment of the disclosure.

In an embodiment of the disclosure, as shown in FIG. 6, a center coordinate of the gaze zone GZ1 (GZ2) of the user U1 (U2) on the display screen 120 is the gaze coordinate G1 (G2), and a radius d of the gaze zone GZ1 (GZ2) of the user U1 (U2) on the display screen 120 may be determined according to a following equation (1), where M is a distance between the eye coordinate E1 (E2) of the user U1 (U2) and the gaze coordinate G1 (G2), and θ is the sight angle.

$$d = M \times \tan(\theta) \qquad \text{equation (1)}$$

In an embodiment of the disclosure, a range of the sight angle θ is, for example, between 3 degrees (included) and 5 degrees (included), though the disclosure is not limited thereto, and the sight angle θ may be determined according to an actual application or design requirement. In an embodiment of the disclosure, in order to avoid a distance between the eyes of the user U1 (U2) and the display screen 120 being too close to result in a fact that the gaze zone GZ1 (GZ2) is too small (i.e., the valid touch area is too small), the radius d of the gaze zone GZ1 (GZ2) may have a minimum setting value. In other words, when the radius d of the gaze zone GZ1 (GZ2) obtained according to the equation (1) is smaller than the minimum setting value, the processing device 160 may set the radius d of the gaze zone GZ1 (GZ2) to the minimum setting value, where the minimum setting value may be determined according to an actual application or design requirement.

Referring to FIG. 1, FIG. 5A, FIG. 5B and FIG. 5C again, in step S5243, the processing device 160 may determine the valid touch area of each of the users according to whether the gaze zone of the user is overlapped with the gaze zone of at least another user. For example, the processing device 160 may determine the valid touch area of the user U1 according to whether the gaze zone GZ1 of the user U1 is overlapped with the gaze zone GZ2 of the user U2. Similarly, the processing device 160 may determine the valid touch area of the user U2 according to whether the gaze zone GZ2 of the user U2 is overlapped with the gaze zone GZ1 of the user U1.

In detail, the step S5243 includes detailed steps S5243_1-S5243_5. In the step S5243_1, the processing device 160 determines whether the gaze zone GZ1 of the user U1 is at least partially overlapped with the gaze zone GZ2 of the user U2 to obtain a determination result. In the embodiment of FIG. 5A, since the gaze zone GZ1 of the user U1 is not overlapped with the gaze zone GZ2 of the user U2 (i.e. the determination result of the step S5243_1 is negative), the processing device 160 takes the gaze zone GZ1 of the user U1 as the valid touch area (which is referred to as valid touch area GZ1) of the user U1 on the display screen 120, and takes the gaze zone GZ2 of the user U2 as the valid touch area (which is referred to as valid touch area GZ2) of the user U2 on the display screen 120, which is shown as the step S5243_2.

Then, in the step S5244, the processing device 160 determines whether the user U1 touches the corresponding valid touch area GZ1. If the determination result of the step S5244 is affirmative, in the step S5245, the processing device 160 calculates a coordinate position where the user U1 touches the valid touch area GZ1 according to the image data IMD to obtain the touch coordinate T1. If the determination result of the step S5244 is negative, the flow returns to the step S522. Moreover, the method of obtaining the touch coordinate T2 of the user U2 may be deduced by referring to the description of the aforementioned steps S5244 and S5245.

In step S530, the processing device 160 respectively performs corresponding pairing on the touch coordinates T1, T2 and the eye coordinates E1, E2 and the gaze coordinates G1, G2 of the users U1, U2. In detail, the touch coordinate T1 detected by the processing device 160 is located in the valid touch area GZ1 of the user U1, and the processing device 160 may pair the touch coordinate T1 with the eye coordinate E1 and the gaze coordinate G1 of the user U1, and take the eye coordinate E1, the gaze coordinate G1 and the touch coordinate T1 as the characteristic group of the user U1. Similarly, the processing device 160 may pair the touch coordinate T2 with the eye coordinate E2 and the gaze coordinate G2 of the user U2, and take the eye coordinate E2, the gaze coordinate G2 and the touch coordinate T2 as the characteristic group of the user U2.

In step S540, the processing device 160 determines a pointing direction of the user U1 toward the display screen 120 according to at least two characteristics in the characteristic group of the user U1. Further, since the gaze zone GZ1 of the user U1 and the gaze zone GZ2 of the user U2 are not overlapped, the processing device 160 may calculate a vector V1 according to the eye coordinate E1 and the gaze coordinate G1 of the user U1, and take the vector V1 as the pointing direction of the user U1 toward the display screen 120. Similarly, the processing device 160 may calculate a vector V2 according to the eye coordinate E2 and the gaze coordinate G2 of the user U2, and take the vector V2 as the pointing direction of the user U2 toward the display screen 120.

Figure 5D:
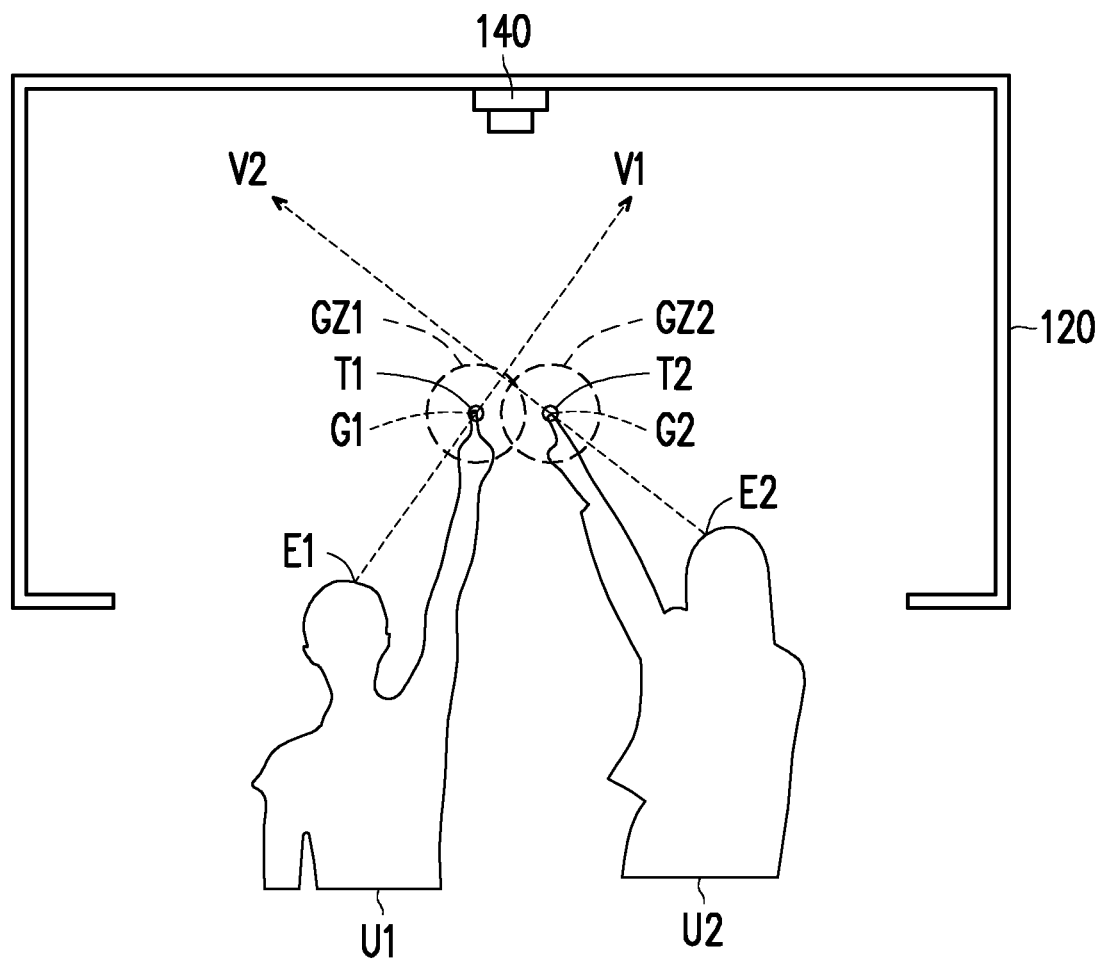
FIG. 5D is a schematic diagram of determining pointing directions of the users by the direction determination system of FIG. 1 according to still another embodiment of the disclosure.

FIG. 5D is a schematic diagram of determining pointing directions of the users by the direction determination system of FIG. 1 according to still another embodiment of the disclosure. Detailed steps of the direction determination method of FIG. 5B and FIG. 5C may also be used for determining the pointing directions of the users of FIG. 5D. Referring to FIG. 1, FIG. 5A-FIG. 5D, compared to the embodiment of FIG. 5A where the gaze zone GZ1 of the user U1 and the gaze zone GZ2 of the user U2 are not overlapped, in FIG. 5D, the gaze zone GZ1 of the user U1 and the gaze zone GZ2 of the user U2 are at least partially overlapped, where the overlapped region between the gaze zone GZ1 of the user U1 and the gaze zone GZ2 of the user U2 in FIG. 5D is smaller than or equal to a threshold value. The threshold value is, for example, a proportion of the overlapped region and the gaze zone GZ1 (or the gaze zone GZ2), which may be set according to an actual application or design requirement. The valid touch areas of the users U1, U2 of FIG. 5D may be different with the valid touch areas of the users U1, U2 of FIG. 5A.

In detail, in the step S5243 of FIG. 5B and FIG. 5C, the processing device 160 determines the valid touch area of each of the users according to whether the gaze zone of the user is overlapped with the gaze zone of at least another one of the users. Further, in the step S5243_1, the processing device 160 determines whether the gaze zone GZ1 of the user U1 is at least partially overlapped with the gaze zone GZ2 of the user U2 to obtain a determination result. In the embodiment of FIG. 5D, the gaze zone GZ1 of the user U1 is at least partially overlapped with the gaze zone GZ2 of the user U2 (i.e. the determination result of the step S5243_1 is affirmative), so that in the step S5243_3, the processing device 160 determines whether the user U1 and the user U2 view a same display object on the display screen 120.

Figure 7A:
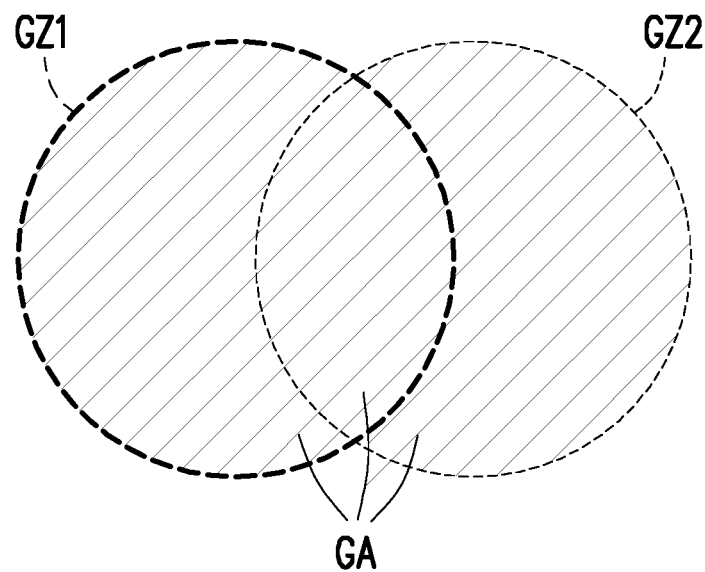
FIG. 7A is a schematic diagram of a valid touch area of a user according to an embodiment of the disclosure.

If the user U1 and the user U2 view a same display object on the display screen 120 (i.e. the determination result of the step S5243_3 is affirmative), the processing device 160 may take the gaze zone GZ1 of the user U1 and the gaze zone GZ2 of the user U2 as the valid touch area of the user U1 on the display screen 120, as shown in the step S5243_4. Similarly, the processing device 160 may take the gaze zone GZ1 of the user U1 and the gaze zone GZ2 of the user U2 as the valid touch area of the user U2 on the display screen 120. In other words, as shown in FIG. 7A, the zones GA included in the gaze zone GZ1 and the gaze zone GZ2 serve as a common valid touch area of the users U1 and U2.

Figure 7B:
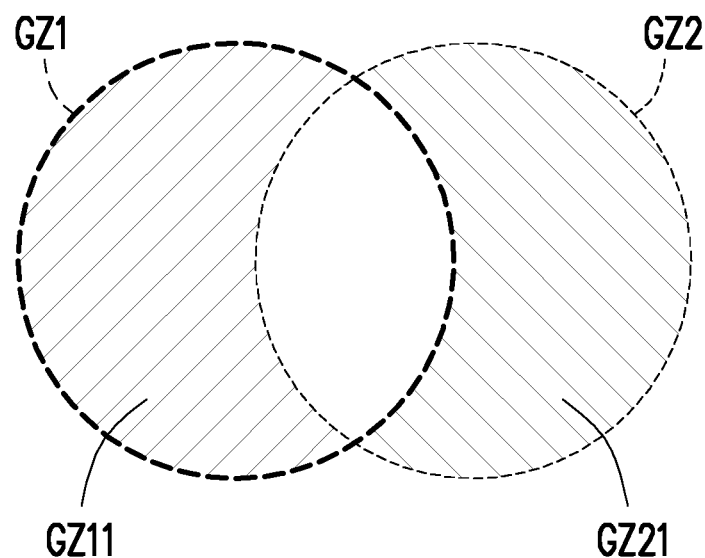
FIG. 7B is a schematic diagram of a valid touch area of a user according to another embodiment of the disclosure.

Comparatively, if the user U1 and the user U2 do not view the same display object on the display screen 120 (i.e. the determination result of the step S5243_3 is negative), as shown in FIG. 7B, the processing device 160 takes a first zone GZ11 in the gaze zone GZ1 of the user U1 as the valid touch area of the user U1 on the display screen 120, where the first zone GZ11 is not overlapped with the gaze zone GZ2 of the user U2, as shown in the step S5243_5. Similarly, the processing device 160 takes a first zone GZ21 in the gaze zone GZ2 of the user U2 as the valid touch area of the user U2 on the display screen 120, where the first zone GZ21 is not overlapped with the gaze zone GZ1 of the user U1.

Moreover, in the step S540 of FIG. 5B, the processing device 160 determines a pointing direction of the user U1 toward the display screen 120 according to at least two characteristics in the characteristic group of the user U1. Further, the overlapped area between the gaze zone GZ1 of the user U1 and the gaze zone GZ2 of the user U2 is less than or equal to the aforementioned threshold value, and the processing device 160 may calculate the vector V1 according to the eye coordinate E1 and the gaze coordinate G1 of the user U1, and take the vector V1 as the pointing direction of the user U1 toward the display screen 120. Similarly, the processing device 160 may calculates the vector V2 according to the eye coordinate E2 and the gaze coordinate G2 of the user U2, and take the vector V2 as the pointing direction of the user U2 toward the display screen 120. Description of other steps used for determining the pointing directions of the users of FIG. 5D in the direction determination method of FIG. 5B may refer to related descriptions of FIG. 5A and FIG. 5B, and details thereof are not repeated.

Figure 5E:
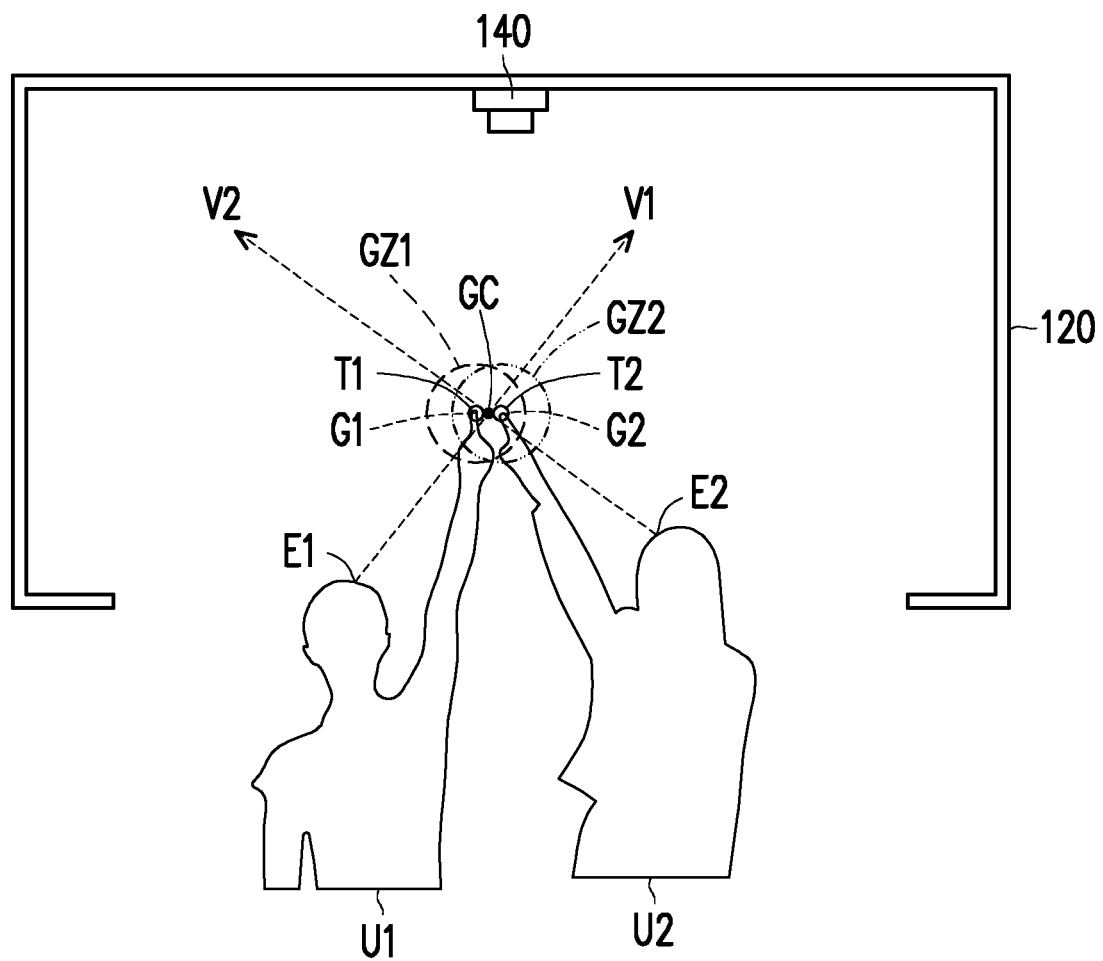
FIG. 5E is a schematic diagram of determining pointing directions of the users by the direction determination system of FIG. 1 according to still another embodiment of the disclosure.

FIG. 5E is a schematic diagram of determining pointing directions of the users by the direction determination system of FIG. 1 according to still another embodiment of the disclosure. Detailed steps of the direction determination method of FIG. 5B and FIG. 5C may also be used for determining the pointing directions of the users of FIG. 5E. Referring to FIG. 1, FIG. 5B-FIG. 5E, similar to FIG. 5D, the gaze zone GZ1 of the user U1 and the gaze zone GZ2 of the user U2 in FIG. 5E are at least partially overlapped. Therefore, the determination method of the valid touch areas of the users U1, U2 of FIG. 5E may refer to the related description of FIG. 5D, and detail thereof is not repeated.

Moreover, compared to the embodiment of FIG. 5D where the overlapped area between the gaze zone GZ1 of the user U1 and the gaze zone GZ2 of the user U2 is less than or equal to the threshold value, an overlapped area between the gaze zone GZ1 of the user U1 and the gaze zone GZ2 of the user U2 in FIG. 5E is greater than the aforementioned threshold value. Determination details of the pointing directions of the users U1, U2 of FIG. 5E may be different with determination details of the pointing directions of the users U1, U2 of FIG. 5D.

In detail, in the step S540 of FIG. 5B, the processing device 160 determines the pointing direction of the user U1 toward the display screen 120 according to at least two characteristics in the characteristic group of the user U1. Further, the overlapped area between the gaze zone GZ1 of the user U1 and the gaze zone GZ2 of the user U2 in FIG. 5E is greater than the aforementioned threshold value, and the processing device 160 may calculate a common coordinate GC according to the gaze coordinate G1 of the user U1 and the gaze coordinate G2 of the user U2, and calculate the vector V1 according to the common coordinate GC and the eye coordinate E1 of the user U1, and take the vector V1 as the pointing direction of the user U1 toward the display screen 120. Similarly, the processing device 160 may calculate the vector V2 according to the common coordinate GC and the eye coordinate E2 of the user U2, and take the vector V2 as the pointing direction of the user U2 toward the display screen 120. In an embodiment of the disclosure, the common coordinate GC is, for example, a center point coordinate of the gaze coordinate G1 of the user U1 and the gaze coordinate G2 of the user U2, though the disclosure is not limited thereto.

Description of other steps used for determining the pointing directions of the users of FIG. 5E in the direction determination method of FIG. 5B may refer to related descriptions of FIG. 5A and FIG. 5B, and details thereof are not repeated.

Figure 8A:
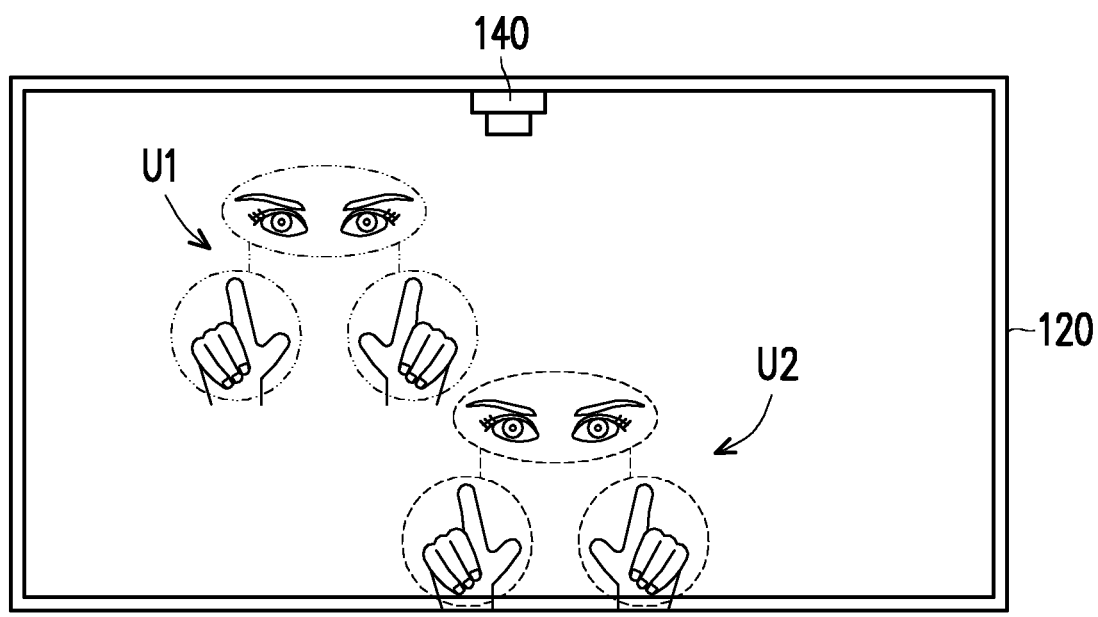
FIG. 8A is a schematic diagram of pairing a plurality of characteristics of a plurality of users according to still another embodiment of the disclosure.
Figure 8B:
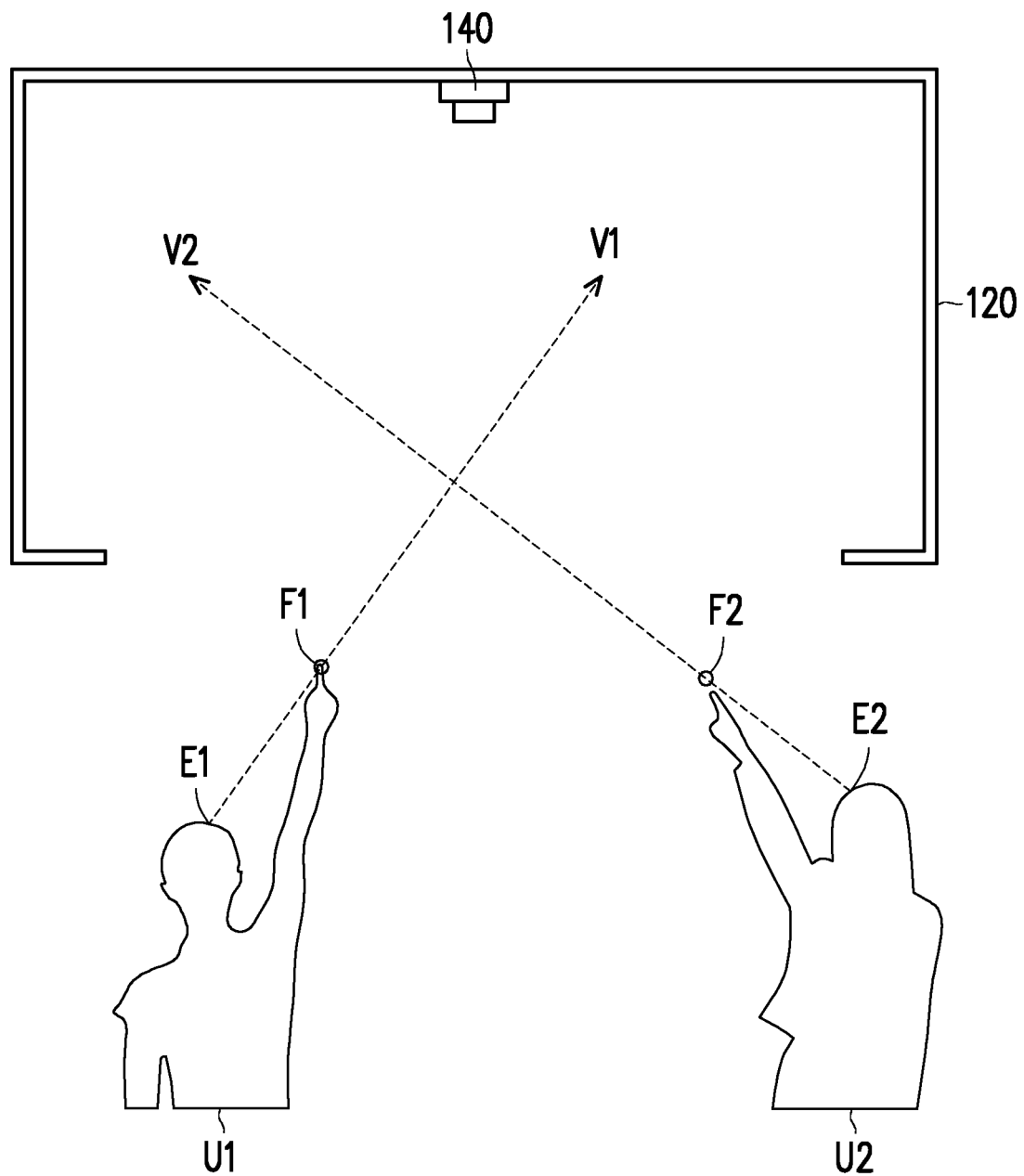
FIG. 8B is a schematic diagram of determining pointing directions of a plurality of users according to still another embodiment of the disclosure.
Figure 8C:
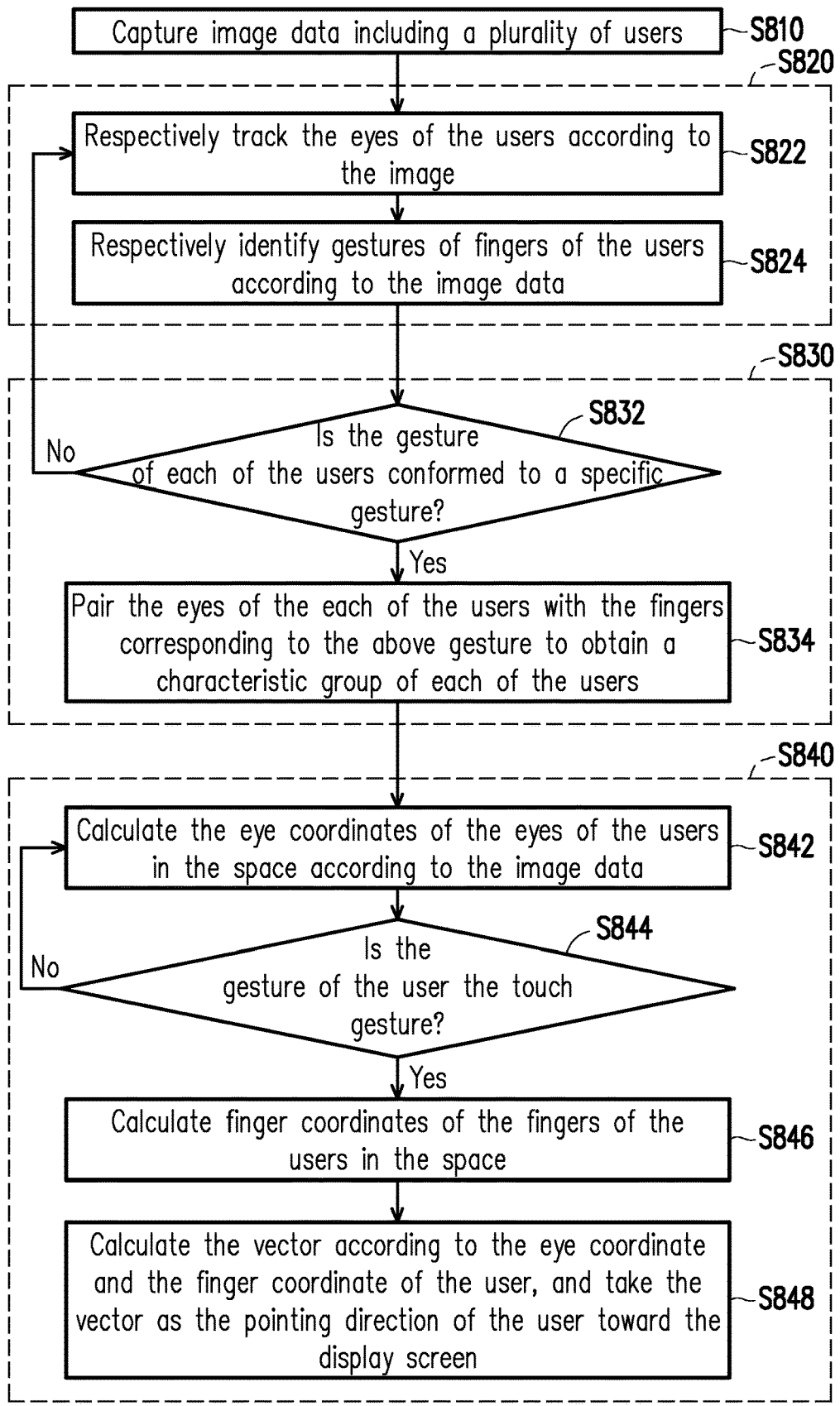
FIG. 8C is a flowchart illustrating detailed steps of the direction determination method of FIG. 2 according to still another embodiment of the disclosure.

FIG. 8A is a schematic diagram of pairing a plurality of characteristics of a plurality of users according to still another embodiment of the disclosure, FIG. 8B is a schematic diagram of determining pointing directions of a plurality of users according to still another embodiment of the disclosure, and FIG. 8C is a flowchart illustrating detailed steps of the direction determination method of FIG. 2 according to still another embodiment of the disclosure. In the embodiment of FIG. 8B, the users U1 and U2 may not touch the display screen 120. Referring to FIG. 1, FIG. 8A and FIG. 8C, in step S810, the image capturing device 140 captures the image data IMD including the users U1 and U2. In step S820, the processing device 160 detects a plurality of characteristics CHS of the plurality of users U1 and U2 according to the image data IMD. In the embodiment, the characteristics CHS of the users U1 and U2 are, for example, eyes, fingers and gestures. Further, the step S820 may include detailed steps S822 and S824. In the step S822, the processing device 160 respectively tracks the eyes of the users U1, U2 according to the image data IMD. In the step S824, the processing device 160 respectively identifies gestures of fingers of the users U1, U2 according to the image data IMD.

In step S830, the processing device 160 performs corresponding pairing on the eyes and the fingers of the users U1, U2. In detail, the step S830 includes detailed steps S832 and S834. In step S832, the processing device 160 determines whether the gesture of the user U1 is conformed to a specific gesture, where the specific gesture may be set according to an actual application or design requirement. If the determination result of the step S832 is affirmative, in step S834, the processing device 160 pairs the eyes of the user U1 with the fingers corresponding to the above gesture to obtain a characteristic group (including the eyes and the fingers) of the user U1. If the determination result of the step S832 is negative, the flow returns to the step S822. Moreover, the method for obtaining a characteristic group of the user U2 may be deduced according to the description of the aforementioned steps S832 and S834, and details thereof are not repeated.

Referring to FIG. 1, FIG. 8B and FIG. 8C, in step S840, the processing device 160 determines a pointing direction of each of the users U1 and U2 toward the display screen 120 according to the characteristics in the characteristic group of each of the users U1 and U2. In detail, the step S840 includes detailed steps S842, S844, S846 and S848. In the step S842, the processing device 160 calculates the eye coordinates E1, E2 of the eyes of the users U1 and U2 in the space according to the image data IMD. In the step S844, the processing device 160 performs skeleton tracking according to the image data IMD to determine whether the gestures of the users U1 and U2 are touch gestures. If the determination result of the step S844 is affirmative, in the step S846, the processing device 160 calculates finger coordinates F1, F2 of the fingers of the users U1 and U2 in the space. If the determination result of the step S844 is negative, the flow returns to the step S842. In the step S848, the processing device 160 calculates the vector V1 according to the eye coordinate E1 and the finger coordinate F1 of the user U1, and takes the vector V1 as the pointing direction of the user U1 toward the display screen 120. Similarly, the processing device 160 calculates the vector V2 according to the eye coordinate E2 and the finger coordinate F2 of the user U2, and takes the vector V2 as the pointing direction of the user U2 toward the display screen 120. Moreover, through the determination of the step S844, misjudgement of the processing device 160 caused by random waving of arms of the users U1 and U2 is avoided, to improve accuracy of the pointing direction determination.

Figure 9A:
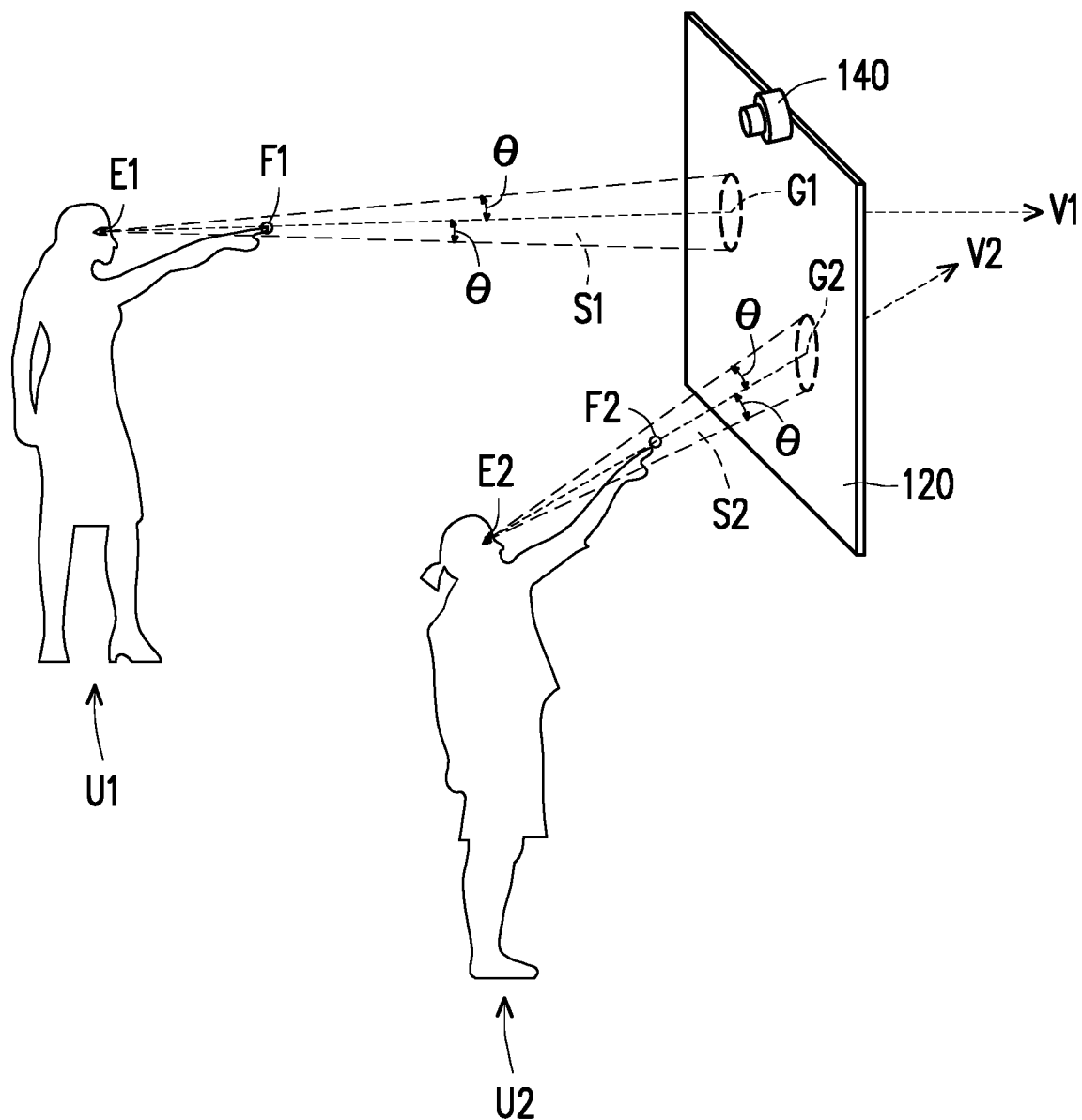
FIG. 9A is a schematic diagram of determining pointing directions of a plurality of users according to still another embodiment of the disclosure.
Figure 9B:
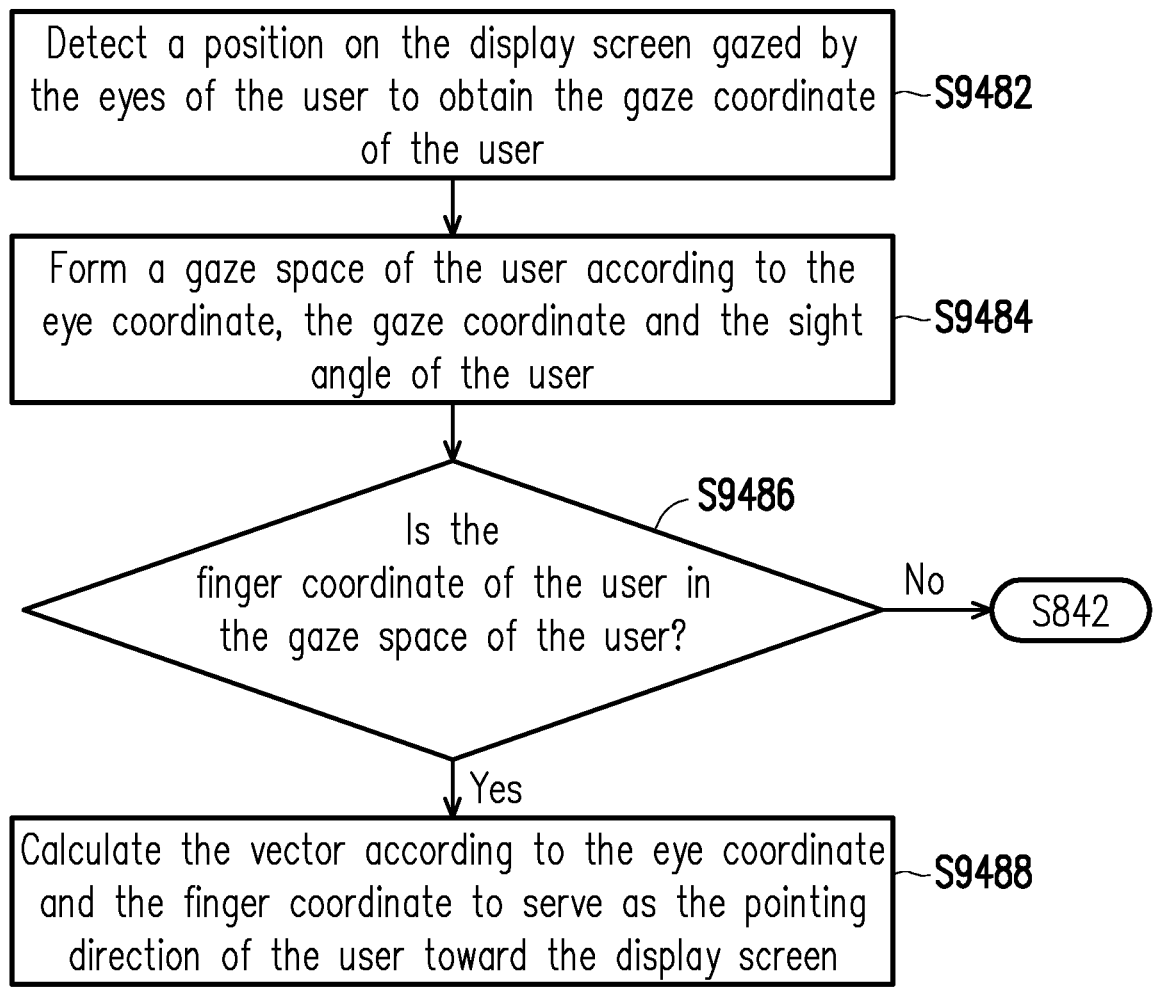
FIG. 9B is a flowchart illustrating detailed steps of a step S848 of FIG. 8C according to an embodiment of the disclosure.

FIG. 9A is a schematic diagram of determining pointing directions of a plurality of users according to still another embodiment of the disclosure, and FIG. 9B is a flowchart illustrating detailed steps of the step S848 of FIG. 8C according to an embodiment of the disclosure. In the embodiment of FIG. 9A, the users U1 and U2 do not directly touch the display screen 120. Referring to FIG. 1, FIG. 8C, FIG. 9A and FIG. 9B, the step S848 includes detailed steps S9482, S9484, S9486 and S9488. In the step S9482, the processing device 160 detects a position on the display screen 120 gazed by the eyes of the user U1 to obtain the gaze coordinate G1 of the user U1. In the step S9484, the processing device 160 forms a gaze space S1 of the user U1 according to the eye coordinate E1, the gaze coordinate G1 and the sight angle θ of the user U1. In the step S9486, the processing device 160 determines whether the finger coordinate F1 of the user U1 is in the gaze space S1 of the user U1 through finger tracking. If the determination result of the step S9486 is affirmative, in the step S9488, the processing device 160 calculates the vector V1 according to the eye coordinate E1 and the finger coordinate F1 to serve as the pointing direction of the user U1 toward the display screen 120. If the determination result of the step S9486 is negative, the flow returns to the step S842. Similarly, a gaze space S2 of the user U2 and the pointing direction of the user U2 toward the display screen 120 may also be deduced according to the descriptions of the steps S9482, S9484, S9486 and S9488, and details thereof are not repeated. Moreover, through the determination of the step S9486, misjudgement of the processing device 160 caused by random waving of arms of the users U1 and U2 is avoided, to improve accuracy of the pointing direction determination.

In an embodiment of the disclosure, the user U1 and the user U2 may also be grouped into a same group. For example, if the user U1 and the user U2 are in the same group, even if the gesture of the user U2 is not the touch gesture, once the finger coordinates F1 of the user U1 enter the gaze space S2 of the user U2, the processing device 160 may calculate the vector V2 according to the eye coordinate E2 of the user U2 and the finger coordinate F1 of the user U1 to serve as the pointing direction of the user U2 toward the display screen 120.

In the above embodiments, although two users or three users are taken as an example for description, the disclosure is not limited thereto. The direction determination method of more than three users may be deduced according to the descriptions of the aforementioned embodiments, and detail thereof is not repeated.

The direction determination system and the direction determination method of the embodiments of the disclosure may correctly determine the pointing directions of the users in case of interaction with multiple users at the same time, to avoid occurrence of the problem of directionality disorder.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A direction determination method, comprising:
capturing image data comprising a plurality of users by at least one image capturing device; and performing following steps by a processing device:
  detecting a plurality of characteristics of the plurality of users according to the image data, wherein the plurality of characteristics comprise a plurality of eyes, a plurality of eye coordinates, a plurality of fingers, a plurality of touch coordinates, or a plurality of gestures;
  performing corresponding pairing on the characteristics to obtain a characteristic group of each of the users; and
  determining a pointing direction of each of the users toward a display screen according to at least two characteristics of the characteristic group of each of the users,
  wherein the step of detecting the characteristics of the users according to the image data comprises:
  performing eye detection according to the image data to respectively obtain the plurality of eye coordinates of the plurality of eyes of the users in a space; and
  performing touch detection according to the image data to respectively obtain the plurality of touch coordinates of the users touching the display screen physically,
  wherein the step of performing touch detection according to the image data to respectively obtain the touch coordinates of the users touching the display screen comprises:
  setting a valid touch area corresponding to each of the users on the display screen;
  wherein the step of setting the valid touch area corresponding to each of the users on the display screen comprises:
  detecting a position on the display screen gazed by the eyes of each of the users to obtain a gaze coordinate of each of the users;
  calculating a gaze zone of each of the users on the display screen according to the eye coordinate, the gaze coordinate and a sight angle of each of the users; and
  determining the valid touch area of each of the users according to whether the gaze zone of the user is overlapped with the gaze zone of at least another one of the users.

2. The direction determination method as claimed in claim 1,
  wherein the step of performing corresponding pairing on the characteristics to obtain the characteristic group of each of the users comprises:
    respectively calculating distances between the eye coordinates and the touch coordinates; and
    respectively performing corresponding pairing on the touch coordinates and the eye coordinates according to the distances, to obtain the characteristic group of each of the users,
  wherein the step of determining the pointing direction of each of the users toward the display screen according to the at least two characteristics of the characteristic group of each of the users comprises:
    calculating a vector according the eye coordinate and the touch coordinate in the characteristic group of the user; and
    taking the vector as the pointing direction of the user toward the display screen.

3. The direction determination method as claimed in claim 1, wherein the step of performing touch detection according to the image data to respectively obtain the touch coordinates of the users touching the display screen comprises:
  determining whether each of the users touches the corresponding valid touch area to obtain a first determination result; and
  if the first determination result is affirmative, calculating the touch coordinates that each of the users touches the corresponding valid touch area according to the image data, else
  performing the eye detection according to the image data to respectively obtain the plurality of eye coordinates of the plurality of eyes of the users in the space.

4. The direction determination method as claimed in claim 1, wherein the step of determining the valid touch area of each of the users according to whether the gaze zone of the user is overlapped with the gaze zone of at least another one of the users comprises:
  determining whether the gaze zone of each of the users is at least partially overlapped with the gaze zone of the at least another one of the users to obtain a second determination result;
  if the second determination result is negative, taking the gaze zone of the user on the display screen as the valid touch area of the user on the display screen;
  if the second determination result is affirmative, determining whether the user and the at least another one of the users view a same display object on the display screen to obtain a third determination result;
  if the third determination result is affirmative, taking the gaze zone of the user on the display screen and the gaze zone of the at least another one of the users on the display screen as the valid touch area of the user on the display screen; and
  if the third determination result is negative, taking a first zone in the gaze zone of the user on the display screen as the valid touch area of the user on the display screen, wherein the first zone is not overlapped with the gaze zone of the at least another one of the users on the display screen.

5. The direction determination method as claimed in claim 4, wherein the characteristics further comprise the gaze coordinate of each of the users,
  wherein the step of performing corresponding pairing on the characteristics to obtain the characteristic group of each of the users comprises:
    pairing the touch coordinate of the user touching the corresponding valid touch area with the eye coordinate and the gaze coordinate of the user to obtain the characteristic group of the user,
  wherein the step of determining the pointing direction of each of the users toward the display screen according to the at least two characteristics of the characteristic group of each of the users comprises:
    if the second determination result is negative, calculating a vector according to the eye coordinate and the gaze coordinate in the characteristic group of the user;
    if the second determination result is affirmative, determining whether an overlapped area between the gaze zone of the user on the display screen and the gaze zone of the at least another one of the users on the display screen is greater than a threshold value to obtain a fourth determination result;
    if the fourth determination result is negative, calculating the vector according to the eye coordinate and the gaze coordinate of the user;
    if the fourth determination result is affirmative, calculating a common coordinate according to the gaze coordinate of the user and the gaze coordinate of the at least another one of the users, and calculating the vector according to the common coordinate and the eye coordinate of the user; and taking the vector as the pointing direction of the user toward the display screen.

6. The direction determination method as claimed in claim 1, wherein the step of detecting the characteristics of the users according to the image data comprises:
respectively tracking the plurality of eyes of the users according to the mage data; and
respectively identifying the plurality of gestures of the plurality of fingers of the users according to the image data, wherein the step of performing corresponding pairing on the characteristics to obtain the characteristic group of each of the users comprises:
determining whether the gesture of each of the users is conformed to a specific gesture to obtain a first determination result; and
if the first determination result is affirmative, pairing the eyes of the user with the finger corresponding to the gesture to obtain the characteristic group of each of the users, else
respectively tracking the plurality of eyes of the users according to the image data.

7. The direction determination method as claimed in claim 6, wherein the step of determining the pointing direction of each of the users toward the display screen according to the at least two characteristics of the characteristic group of each of the users comprises:
calculating the eye coordinate of the eyes of the user in the space according to the image data;
determining whether the gesture of the user is a touch gesture according to the image data to obtain a second determination result;
if the second determination result is affirmative, calculating a finger coordinate of the finger of the user in the space; and
calculating a vector according to the eye coordinate and the finger coordinate of the user to serve as the pointing direction of the user toward the display screen, else
calculating the eye coordinate of the eyes of the user in the space according to the image data.

8. The direction determination method as claimed in claim 7, wherein the step of calculating the vector according to the eye coordinate and the finger coordinate of the user comprises:
detecting the position on the display screen gazed by the eyes of the user to obtain the gaze coordinate of the user;
forming a gaze space of the user according to the eye coordinate, the gaze coordinate and a sight angle of the user;
determining whether the finger coordinate of the user is located in the gaze space of the user to obtain a third determination result; and
if the third determination result is affirmative, calculating the vector according to the eye coordinate and the finger coordinate, else
calculating the eye coordinate of the eyes of the user in the space according to the image data.

9. A direction determination system, comprising:
a display screen;
at least one image capturing device, configured to capture image data comprising a plurality of users; and
a processing device, coupled to the display screen and the at least one image capturing device to receive the image data, and detecting a plurality of characteristics of the plurality of users according to the image data, wherein the plurality of characteristics comprise a plurality of eyes, a plurality of eye coordinates, a plurality of fingers, a plurality of touch coordinates, or a plurality of gestures,
wherein the processing device performs corresponding pairing on the characteristics to obtain a characteristic group of each of the users, and determines a pointing direction of each of the users toward the display screen according to at least two characteristics of the characteristic group of each of the users,
wherein the processing device performs eye detection according to the image data to respectively obtain the plurality of eye coordinates of the plurality of eyes of the users in a space, and performs touch detection according to the image data to respectively obtain the plurality of touch coordinates of the users touching the display screen physically,
wherein the processing device sets a valid touch area corresponding to each of the users on the display screen,
wherein the processing device detects a position on the display screen gazed by the eyes of each of the users to obtain a gaze coordinate of each of the users, calculates a gaze zone of each of the users on the display screen according to the eye coordinate, the gaze coordinate and a sight angle of each of the users, and determines the valid touch area of each of the users according to whether the gaze zone of the user is overlapped with the gaze zone of at least another one of the users.

10. The direction determination system as claimed in claim 9, wherein
the processing device respectively calculates distances between the eye coordinates and the touch coordinates, and respectively performs corresponding pairing on the touch coordinates and the eye coordinates according to the distances, to obtain the characteristic group of each of the users; and
the processing device calculating a vector according the eye coordinate and the touch coordinate in the characteristic group of the user, and takes the vector as the pointing direction of the user toward the display screen.

11. The direction determination system as claimed in claim 9, wherein
if each of the users touches the corresponding valid touch area, the processing device calculates the touch coordinate that each of the users touches the corresponding valid touch area according to the image data, else
the processing device performs the eye detection according to the image data to respectively obtain the plurality of eye coordinates of the plurality of eyes of the users in the space.

12. The direction determination system as claimed in claim 9, wherein
if the gaze zone of the user is not overlapped with the gaze zone of the at least another one of the users, the processing device takes the gaze zone of the user on the display screen as the valid touch area of the user on the display screen,
if the gaze zone of the user is at least partially overlapped with the gaze zone of the at least another one of the users, and the user and the at least another one of the users view a same display object on the display screen, the processing device takes the gaze zone of the user on the display screen and the gaze zone of the at least another one of the users on the display screen as the valid touch area of the user on the display screen, and if the gaze zone of the user is at least partially overlapped with the gaze zone of the at least another one of the users, and the user and the at least another one of the users do not view the same display object on the display screen, the processing device takes a first zone in the gaze zone of the user on the display screen as the valid touch area of the user on the display screen, wherein the first zone is not overlapped with the gaze zone of the at least another one of the users on the display screen.

13. The direction determination system as claimed in claim 12, wherein the characteristics further comprise the gaze coordinate of each of the users, wherein the processing device pairs the touch coordinate of the user touching the corresponding valid touch area with the eye coordinate and the gaze coordinate of the user to obtain the characteristic group of the user, if the gaze zone of the user is not overlapped with the gaze zone of the at least another one of the users, or an overlapped area between the gaze zone of the user on the display screen and the gaze zone of the at least another one of the users on the display screen is smaller than or equal to a threshold value, the processing device calculates a vector according to the eye coordinate and the gaze coordinate of the user to serve as the pointing direction of the user toward the display screen, if the overlapped area is greater than the threshold value, the processing device calculates a common coordinate according to the gaze coordinate of the user and the gaze coordinate of the at least another one of the users, and calculates the vector according to the common coordinate and the eye coordinate of the user to serve as the pointing direction of the user toward the display screen.

14. The direction determination system as claimed in claim 9, wherein the processing device respectively tracks the plurality of eyes of the users according to the image data, and respectively identifies the plurality of gestures of the plurality of fingers of the users according to the image data, if the gesture of each of the users is conformed to a specific gesture, the processing device pairs the eyes of the user with the finger corresponding to the gesture to obtain the characteristic group of each of the users, else the processing device respectively tracks the plurality of eyes of the users according to the image data.

15. The direction determination system as claimed in claim 14, wherein the processing device calculates the eye coordinate of the eyes of the user in the space according to the image data, and determines whether the gesture of the user is a touch gesture according to the image data, if the gesture of the user is the touch gesture, the processing device calculates a finger coordinate of the finger of the user in the space, and calculates a vector according to the eye coordinate and the finger coordinate of the user to serve as the pointing direction of the user toward the display screen, else the processing device calculates the eye coordinate of the eyes of the user in the space according to the image data.

16. The direction determination system as claimed in claim 15, wherein the processing device detects the position on the display screen gazed by the eyes of the user to obtain the gaze coordinate of the user, forms the gaze space of the user according to the eye coordinate, the gaze coordinate and a sight angle of the user, and determines whether the finger coordinate of the user is located in the gaze space of the user, if the finger coordinate of the user is located in the gaze space of the user, the processing device calculates the vector according to the eye coordinate and the finger coordinate, else the processing device calculates the eye coordinate of the eyes of the user in the space according to the image data.

\* \* \* \* \*